United States Patent [19]
Fenwick et al.

[11] Patent Number: 5,673,394
[45] Date of Patent: Sep. 30, 1997

[54] METHOD OF SHARING MEMORY BETWEEN AN OPERATING SYSTEM AND AN APPLICATION PROGRAM

[75] Inventors: Thomas Fenwick; Darryl E. Rubin, both of Redmond, Wash.

[73] Assignee: Microsoft Corporation, Redmond, Wash.

[21] Appl. No.: 113,798

[22] Filed: Aug. 30, 1993

Related U.S. Application Data

[63] Continuation of Ser. No. 608,154, Oct. 31, 1990, abandoned.

[51] Int. Cl.⁶ .................................................. H01J 13/00
[52] U.S. Cl. ............................ 395/200.08; 395/200.13; 395/424; 395/475; 395/200.1
[58] Field of Search ........................ 395/200, 275, 395/325, 600, 575, 650, 425, 250, 700, 200.01–200.08, 200.13, 440, 450, 474–480

[56] References Cited

U.S. PATENT DOCUMENTS

| | | | |
|---|---|---|---|
| 4,309,755 | 1/1982 | Lanty | 395/275 |
| 4,486,854 | 12/1984 | Yuni | 395/425 |
| 4,881,163 | 11/1989 | Thomas et al. | 395/250 |
| 4,887,204 | 12/1989 | Johnson et al. | 395/600 |
| 4,897,781 | 1/1990 | Chang et al. | 395/600 |
| 4,956,808 | 9/1990 | Aakre et al. | 395/250 |
| 4,994,963 | 2/1991 | Korden et al. | 395/325 |
| 5,001,628 | 3/1991 | Johnson et al. | 395/325 |
| 5,032,979 | 7/1991 | Hecht et al. | 395/575 |
| 5,058,006 | 10/1991 | Durdon et al. | 395/325 |
| 5,089,956 | 2/1992 | MacPhail | 395/600 |
| 5,093,779 | 3/1992 | Sakurai | 395/600 |
| 5,113,519 | 5/1992 | Johnson et al. | 395/600 |
| 5,129,083 | 7/1992 | Cutler et al. | 395/600 |
| 5,133,053 | 7/1992 | Johnson et al. | 395/600 |
| 5,151,990 | 9/1992 | Allen et al. | 395/650 |
| 5,155,842 | 10/1992 | Rubin | 395/200 |
| 5,163,131 | 11/1992 | Row et al. | 395/200 |
| 5,218,695 | 6/1993 | Noveck et al. | 395/600 |
| 5,249,279 | 9/1993 | Schmenk et al. | 395/425 |
| 5,301,350 | 4/1994 | Rogan et al. | 395/600 |
| 5,305,440 | 4/1994 | Morgan et al. | 395/200 |
| 5,347,632 | 9/1994 | Filepp et al. | 395/200 |
| 5,355,453 | 10/1994 | Row et al. | 395/200 |

*Primary Examiner*—Tariq R. Hafiz
*Attorney, Agent, or Firm*—Seed and Berry LLP

[57] ABSTRACT

An improved method for the sharing of data among a file server, a file system, and a network driver executing on a computer is provided. The file system allocates cache buffers to be used in reading from or writing to a file. When reading a file, the file system starts loading the cache buffers with the file data. When a buffer is loaded, the file system signals the file server that a buffer at a certain address is loaded. The file server provides the network driver with the buffer address of the data that is ready to be transported onto a computer network. The transport system then reads the data from the cache buffers and sends the data onto the computer network. When writing a file, the file system allocates cache buffers to receive the file. The file system notifies the file server of the cache buffer addresses. The file server then notifies the network driver of the cache buffer addresses. When the network driver receives the data it loads the data directly into the cache buffers. The file system can then write the data from the cache buffers to the disk.

11 Claims, 20 Drawing Sheets

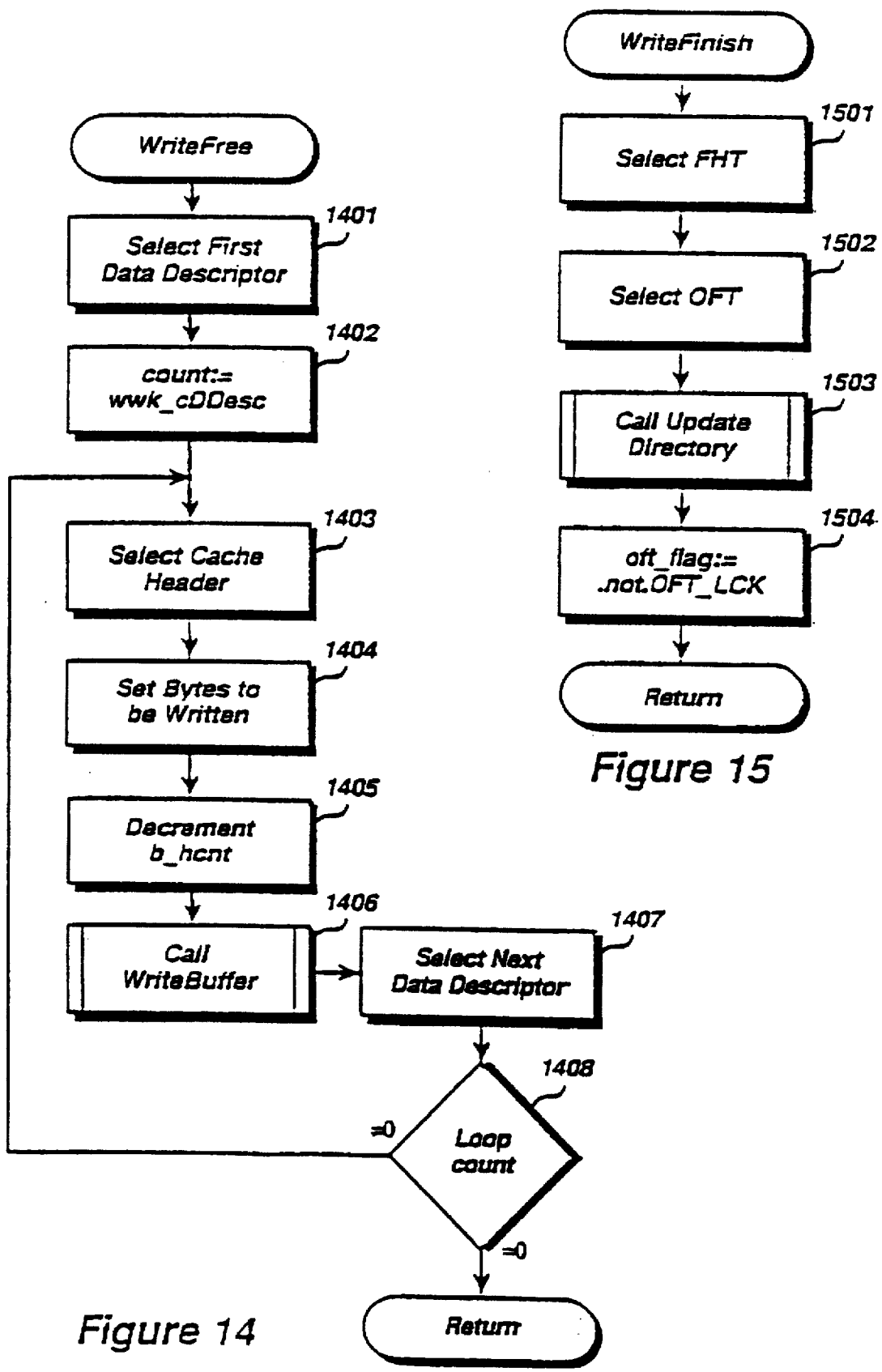

5,673,394

METHOD OF SHARING MEMORY BETWEEN AN OPERATING SYSTEM AND AN APPLICATION PROGRAM

This application is a continuation of U.S. patent application Ser. No. 07/608,154, filed Oct. 31, 1990, now abandoned.

TECHNICAL FIELD

This invention relates generally to a computer system for the sharing of data between a file server and a file system, and more specifically, to a method and an apparatus for sharing of cache memory by a file server and a file system.

BACKGROUND ART

Local Area Networks (LANs) are very popular means for interconnecting computers, especially personal computers. These computers are interconnected so that the users can share resources, such as files. The users of networked computers have found that their productivity is often increased by sharing files. For example, in a law office environment in which attorneys and secretaries have networked computers, an attorney may prepare a draft of a document using a word processor program, such as Microsoft Word, and store the document in a shared file. The attorney's secretary can access the shared file, use the word processing program to put the document in final form, and either print the document or store the revised document in the shared file so that the attorney can make a final review.

Personal computers and their controlling programs, called operating systems, were originally designed to work in a stand-alone mode, that is, not interconnected in a network. The portion of the operating system that manages the files is called the "file system." The designs of file systems, such as the file system of the MS-DOS® operating system, were simplified because the computer was assumed to be used in stand-alone mode. An operating system that supports file sharing is much more complex because it must ensure that two users are not revising the same file at the same time. Otherwise, one user could revise the file and another user could unintentionally replace those revisions with new revisions, causing the loss of the first revisions.

When personal computers were first interconnected into a network, a primary purpose was to share files. However, the then existing file systems did not support file sharing. To overcome this inability to support file sharing, a "file server" application program was introduced. FIG. 1 shows a network that has three computers 101, 102, 103 interconnected. A file server computer 103 executes the file server application program 103a, which provides shared access to the files on a disk drive 104. When an application executing on one of the other computers 101, 102 requests to read a file on the disk drive 104, the requesting application 101a, 102a calls its local file system 101b, 102b. The local file system 101b, 102b determines that the request is for a file in a remote drive 104 and sends the request to the file server computer 103 through its local network driver 101c, 102c. The network driver 103c for the file server computer 103 receives the request and routes the file request to the file server 103a. The file server 103a ensures that the requesting application 101a, 102a has read access to the file. The file server 103a then calls its local file system 103b to retrieve the data from the file. The file server 103a then sends the data through the network to the requesting computer.

It is very useful to have an efficient file server. Because many computers may be networked together, there may be a large demand for access to shared and nonshared files on a disk drive 104. However, the file systems of prior operating systems were not designed to support file servers that support a network of computers.

When retrieving data from a file, prior systems would move the data several times in the computer memory. Referring to FIG. 2, the file system of prior operating systems would load the data from the file into a buffer 201 in the data area of the file system. The data area of the file system is referred to as the "cache memory" or "cache buffer." The file system would then move the from its buffer 201 to a buffer 202 in the data area of the application. Because files are often very large, this moving from cache buffer to application buffer is very time-consuming.

It is desirable to have a file system and file server in which the move from the cache buffer to the application buffer could be eliminated and still allow the file server to access the data.

DISCLOSURE OF THE INVENTION

It is an object of the present invention to provide a method and system of sharing data between a file server and a file system.

It is another object of the present invention to provide a file server that needs no internal data buffers for storing the files retrieved from the file system.

It is another object of the present invention to provide a method and system for transporting files on a computer network without the need for making multiple copies of the file in the internal memory of the transporting computer.

It is another object of the present invention to provide a method and system for transporting a file on a computer network in an overlap mode in which parts of the file are transported while other parts of the file are being retrieved from the disk.

These and other objects, which will become apparent as the invention is more fully described below, are obtained by providing a method and system of cache sharing between a file server and a file system. In a preferred embodiment, a system according to the present invention accomplishes the sharing by providing a set of application program interfaces (API) to the file system. The APIs return pointers to the data in the cache memory rather than moving the data to the application buffer. The APIs also coordinate the holding of these cache buffers to ensure that the data is present when needed by the file server.

BRIEF DESCRIPTION OF THE DRAWINGS

FIG. 14 is a flow diagram of subroutine WriteFree.

FIG. 15 is a flow diagram of subroutine WriteFinish.

DETAILED DESCRIPTION OF THE INVENTION

In a preferred embodiment of the present invention, the file system, file server, and network driver cooperatively interact to reduce the moving of data and to increase the overlapping of disk I/O and network I/O when a file is transferred from one computer to another. When the file server requests a file read, the file system returns a data structure, called a Data Descriptor List. Each Data Descriptor in the list contains information relating to a cache buffer in which a portion of the file will be stored. The file system then stores the file in one or more cache buffers. When a cache buffer has been loaded with part of the file, the file system puts the address of the cache buffer in the appropriate Data Descriptor. The file server is notified of the storing of the address and then directs the network driver to transport the data that is in the cache buffer. When the transport is complete, the file server then waits until notified that the next cache buffer is ready to transport.

Figure 1:
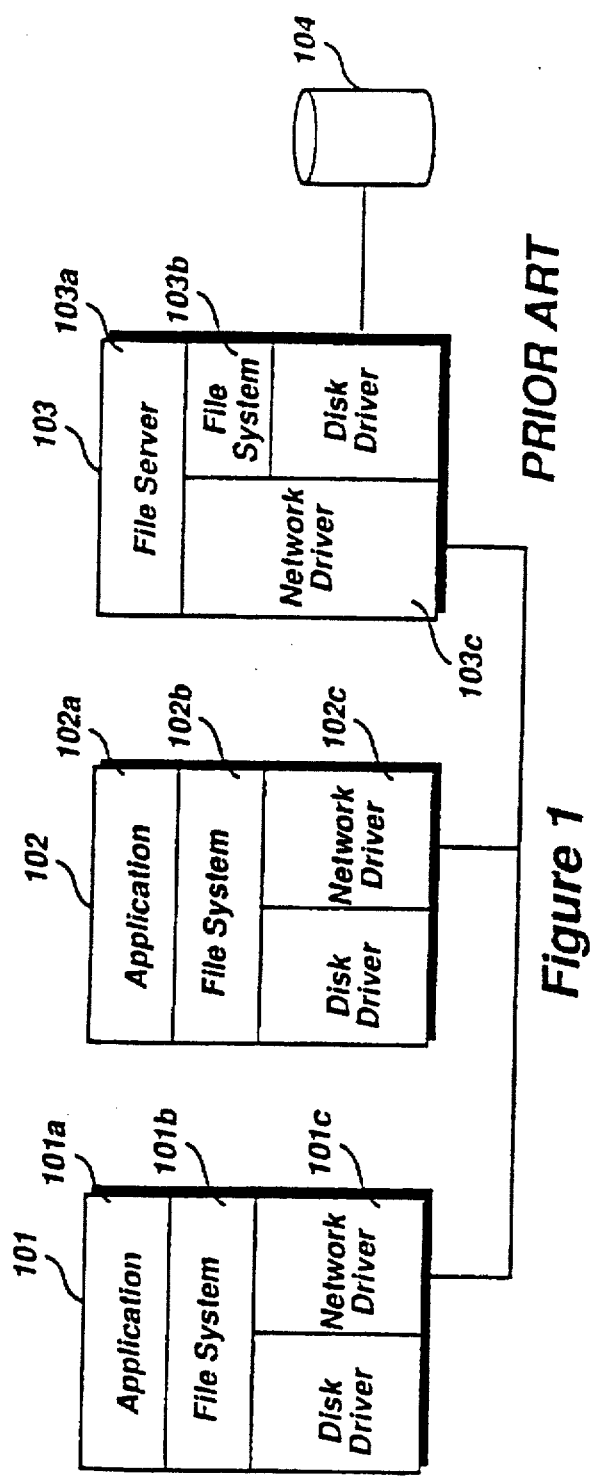
FIG. 1 shows a schematic of a prior computer interconnected to a file server.
Figure 2:
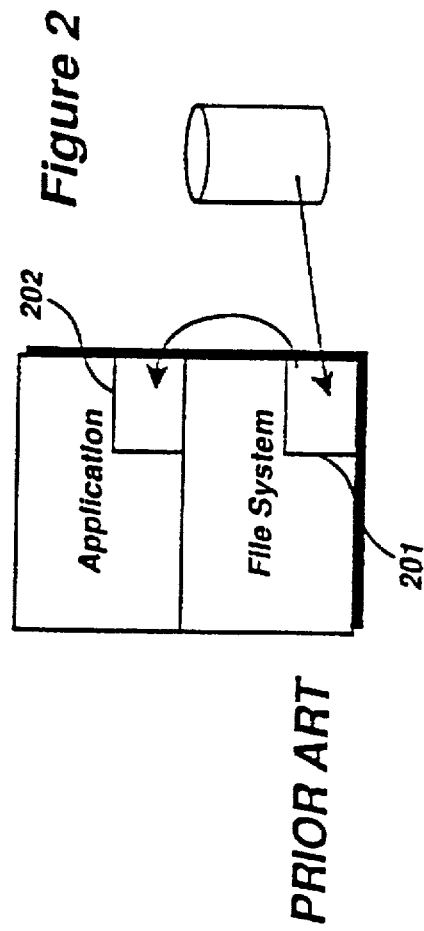
FIG. 2 shows the copying of data from a file system to an application in prior systems.
Figure 3:
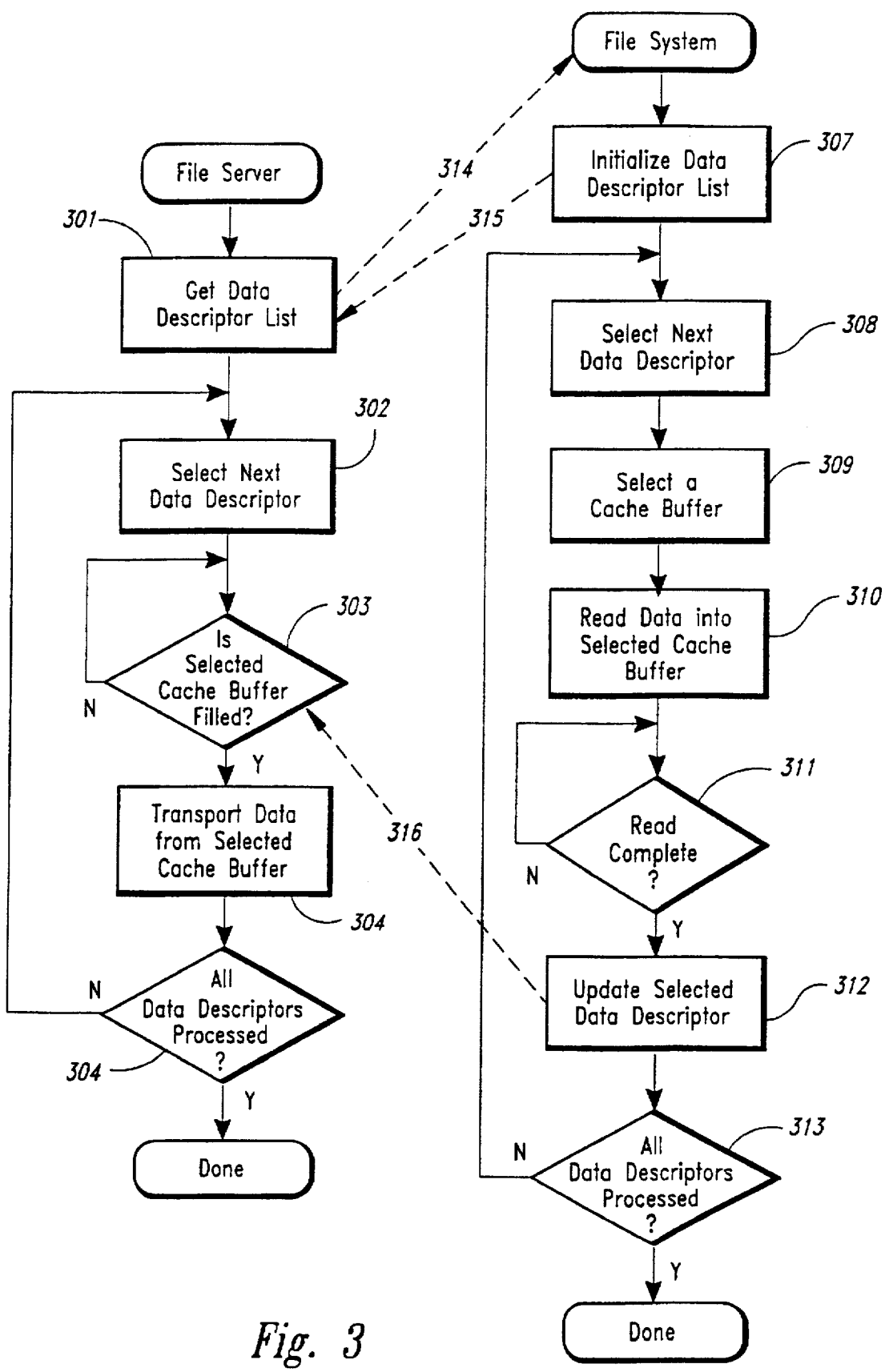
FIG. 3 shows an overview flow chart of a file server and file system of a preferred embodiment of the present invention.

FIG. 3 provides an overview flow chart of the file server and file system in a preferred embodiment of the present invention. The flow chart on the left represents the operation of the file server and the flow chart on the right represents the operation of the file system. In block 301, the file server requests 314 the file system to prepare a list of Data Descriptors for the file to be read. The file system returns 315 a pointer to the Data Descriptors.

In block 307, the file system prepares the Data Descriptor List for the file to be read. In block 308, the file system selects the next Data Descriptor in the list, starting witch the first Data Descriptor in the list. In block 309, the file system selects a cache buffer that is available to be loaded with data. In block 310, the file system issues a read to put the next portion of the file into the selected cache buffer.

In block 311, the file system waits for the read to complete. In block 312, the file system updates the selected Data Descriptor with the address of the selected cache buffer. This signals 316 the file server that the cache buffer is filled. In block 313, if all the Data Descriptors have been processed, then the read is complete, else the file system loops to block 308 to process the next Data Descriptor, that is, read in the next portion of the file.

In blocks 302 through 306, the file server loops processing each Data Descriptor, that is, waiting until the associated cache buffer is filled, transporting the data, and releasing the cache buffer. In block 302, the file server selects the next Data Descriptor in the list, starting with the first Data Descriptor in the list. In block 303, when the file server determines that a cache buffer has been filled for the selected Data Descriptor, it continues at block 304. In block 304, the file server sends a request to the network driver to transport the data stored in the selected cache buffer. In block 306, if all the Data Descriptors have been processed, then the read is complete, else the file server loops to block 302 to process the next Data Descriptor.

In a preferred embodiment of the present invention, the file server and file system also provide a write file capability. The write file capability provides many of the same advantages of the read file capability, such as increasing network I/O and disk I/O overlap and reducing the number of times the file data is moved in memory. A detailed description of the read and write capabilities of a preferred embodiment of the present invention is given following an overview of the file system caching and the data structures used in a preferred embodiment of the present invention.

File System Caching

A typical file system stores data on a disk with a given sector size, such as 512 bytes. Data can only be read from or written to a disk in a full sector, that is, every byte in a sector must be read or written at the same time. A file is not necessarily stored in contiguous sectors on a disk. Each contiguous sector that holds contiguous portions of the file is an extent. Each file has an associated extent table, which contains a list of all the extents that comprise the file.

In prior systems, when an application program requested the file system to read a file, the file system first copied the file into a portion of main memory allocated to the file system, called the file system buffers. The file system then copied the file from its buffers to the buffer of the application program.

In a disk-caching file system, when a read is requested, the file system first checks its buffers, called the cache, to determine whether the requested file has already been transferred from disk to the file system buffers. If so, then the file system does not need to retransfer the file to the cache.

In a preferred embodiment, the file system maintains cache headers and cache buffers. There is a one-to-one correspondence between the cache headers and buffers. In a preferred embodiment, the cache buffers are 2048 bytes in length (2K). Each cache buffer can hold four contiguous sectors of disk data, assuming a 512-byte sector. Each cache header contains information about the associated cache buffer. In a preferred embodiment, the cache header contains the start sector address b_sec and a flag b_dirt indicating whether the buffer needs to be written to disk. When the file system gets a read request, it first checks the cache header to determine whether the file or a portion of the file is already in a cache buffer. If a portion of the file is in a cache buffer, then a transfer from disk can be eliminated. The variable b_addr in the cache header points to the associated cache buffer.

Data Structures

Figure 4:
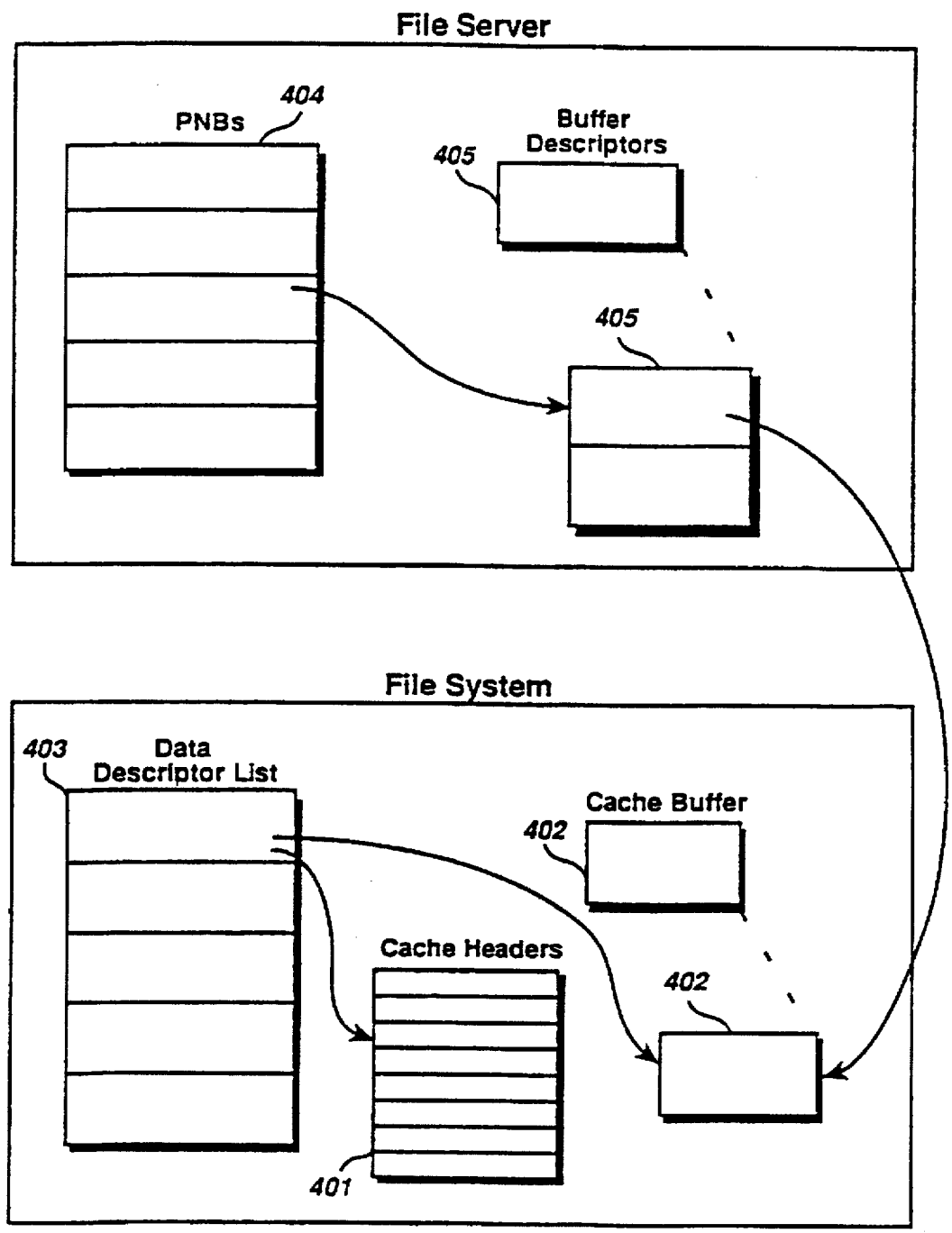
FIG. 4 shows the layout of certain data structures used in a preferred embodiment of the present invention.

FIG. 4 shows the relationships of several of the data structures used in a preferred embodiment of the present invention. Each cache header 401 has an associated cache buffer 402. Each cache header contains information relating to the disk data that is currently in the associated cache buffer. The cache headers and cache buffers are in the data area of the file system. The Descriptor List 403 is also in the data area of the file system. The file system initializes the Data Descriptor List 403 for each read or write request of the present invention. Each Data Descriptor contains information relating to a portion of the file to be read or written. For each Data Descriptor there is an associated cache header. The Data Descriptors contain pointers to the associated cache header and cache buffer and the sector address of the data in the cache buffer.

The file server uses the data structures PNB 404 and Buffer Descriptors 405. The PNB entries contain a network control block (NCB). The NCB is passed by the file server to the network driver to indicate the type of transport request. Each NCB points to a set of Buffer Descriptors 405, each of which points to an associated cache buffer 402.

Table 1 contains the names of the variables and a brief description of the variables used by a preferred embodiment of the present invention.

TABLE 1

| Data Structures | Description |
| --- | --- |
| Data Descriptor | |
| dd_addr | points to first byte to transfer in the cache buffer |
| dd_length | number of bytes to transfer in the cache buffer |
| dd_offset | byte offset where the data begins |
| dd_sector | |
| SNUM | disk sector address of data |
| SHINT | pointer to cache buffer header |
| Buffer Descriptor | |
| bf_DataPtr | pointer to the first byte in cache buffer to transfer |
| bf_DataLen | number of bytes to transfer |
| PNB | |
| pnb_list | pointer to link the PNBs |
| pnb_flag | holds internal state |
| pnb_ncb | |
| ncb_command | network control command |
| ncb_buffer | pointer to the Buffer Descriptors |
| ncb_length | count of bytes to transfer |
| ncb_flags | indicates position of NCB group of NCBs |
| ncb_cmd_cplt | indicates that the network has completed the network request associated with this NCB |
| Read Work Area | |
| rwk_cbData | number of bytes in file to read |
| rwk_pDDesc | pointer to next Data Descriptor to send |
| rwk_cDDesc | number of Data Descriptors left to send |
| rwk_ncbs | pointer to list of NCBs |
| rwk_cNcbs | number of NCBs |
| rwk_bufDesc | Buffer Descriptors |
| Cache Header | |
| b_sec | sector address of data in cache buffer |
| b_addr | pointer to cache buffer |
| b_lcnt | lock count |
| b_hcnt | hold count |
| b_dirt | flag indicating whether the cache needs to be written to disk |
| OFT | |
| oft_hcnt | hold count for an open file |
| Write Work Area | |
| wwk_cImm | number of bytes of immediate data |
| wwk_pImm | pointer to immediate data |
| wwk_cRaw | count of bytes of raw data that will fit into the last cache buffer of immediate data |
| wwk_cbytes | number of bytes to write to the file |
| wwk_pDDesc | pointer to Data Descriptors |
| wwk_cDDesc | count of Data Descriptors |
| wwk_bufDesc | Buffer Descriptors |

READ REQUEST

In a preferred embodiment of the present invention, the file server receives a read request from the network driver. If the read is a "raw mode" read, then the file server calls subroutine ReadRaw. A raw mode read request indicates that the requesting computer expects the file data to be transported on the network without accompanying header information and without packaging the data. Basically, the file server computer transports only the file data. When the file server calls the ReadRaw subroutine, it passes the file handle Fid, the seek position seek_position, and byte count byte_ count. The file handle identifies the open file to read from, the seek position is the byte offset in the file from which the read is to begin, and the byte count indicates the number of bytes to be read. The ReadRaw subroutine and several of the subroutines that it calls are described below.

ReadRaw Subroutine

The subroutine ReadRaw controls the reading of a file from a disk and transporting the data read onto the network. The subroutine input parameters are file handle Fid, seek position seek_position, and number of bytes to read rwk_ cbData. Subroutine ReadRaw uses certain file system APIs to read the file from disk. Once the file system stores data in a cache buffer, the subroutine formats a network control block (NCB). The subroutine ReadRaw then invokes the network driver to transport the data.

Figure 6A:
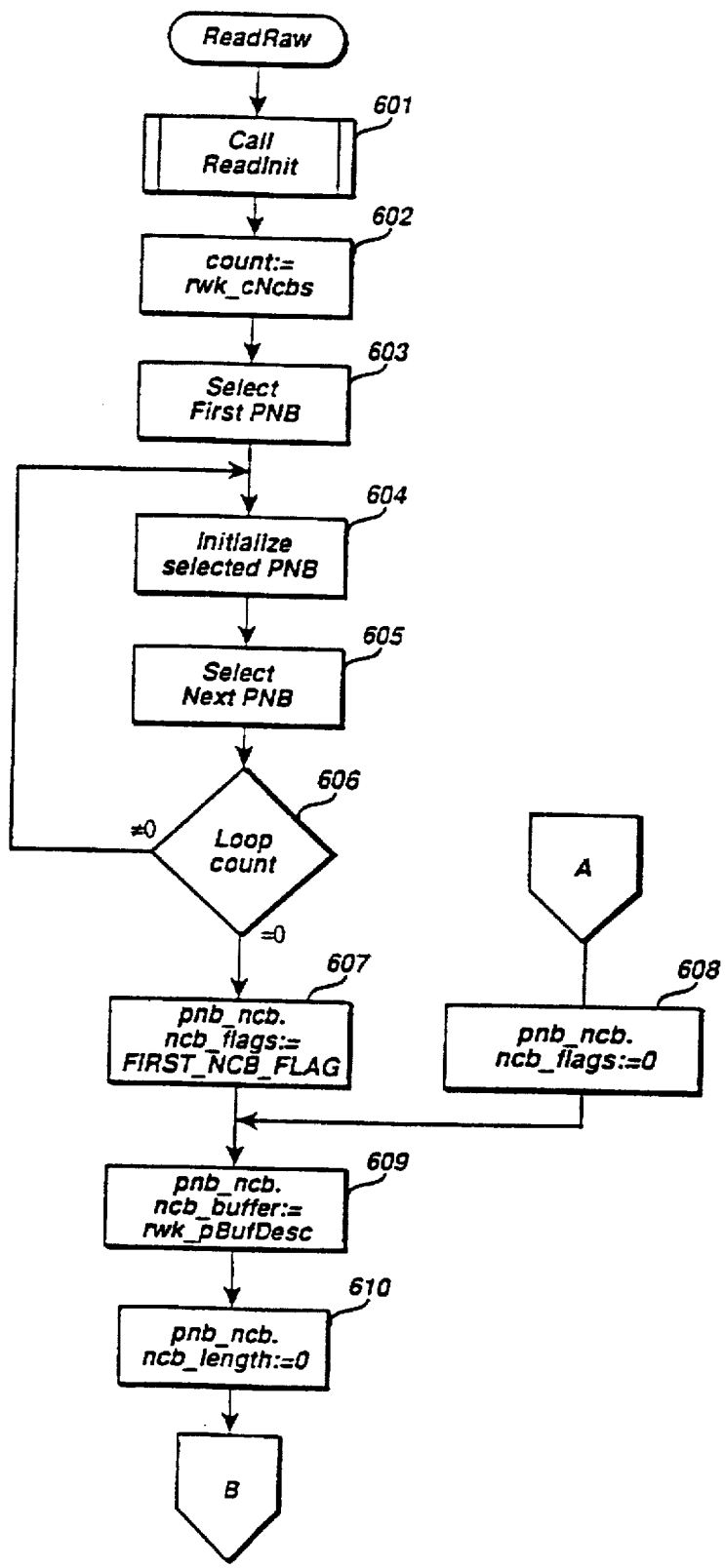
FIGS. 6A, 6B, 6C, and 6D are a flow diagram of the subroutine ReadRaw.

FIGS. 6A, 6B, 6C, and 6d show a flow diagram of a preferred embodiment of the present invention. Referring to FIG. 6A in block 601, the system calls the File System routine ReadInit passing the parameters Fid, seek_position, and rwk_cbData. The subroutine ReadInit initializes a list of Data Descriptors for the read and returns a pointer to Data Descriptors rwk_pDDesc, the count of the Data Descriptors rwk_pDDesc initialized, and the number of bytes read rwk_cbData. Subroutine ReadInit also allocates cache buffer headers for the reads and sets the headers to hold. Setting the headers to hold indicates that the associated cache buffer will not be removed from memory until the hold is removed. The hold is removed after the data is transported on the network.

Figure 5:
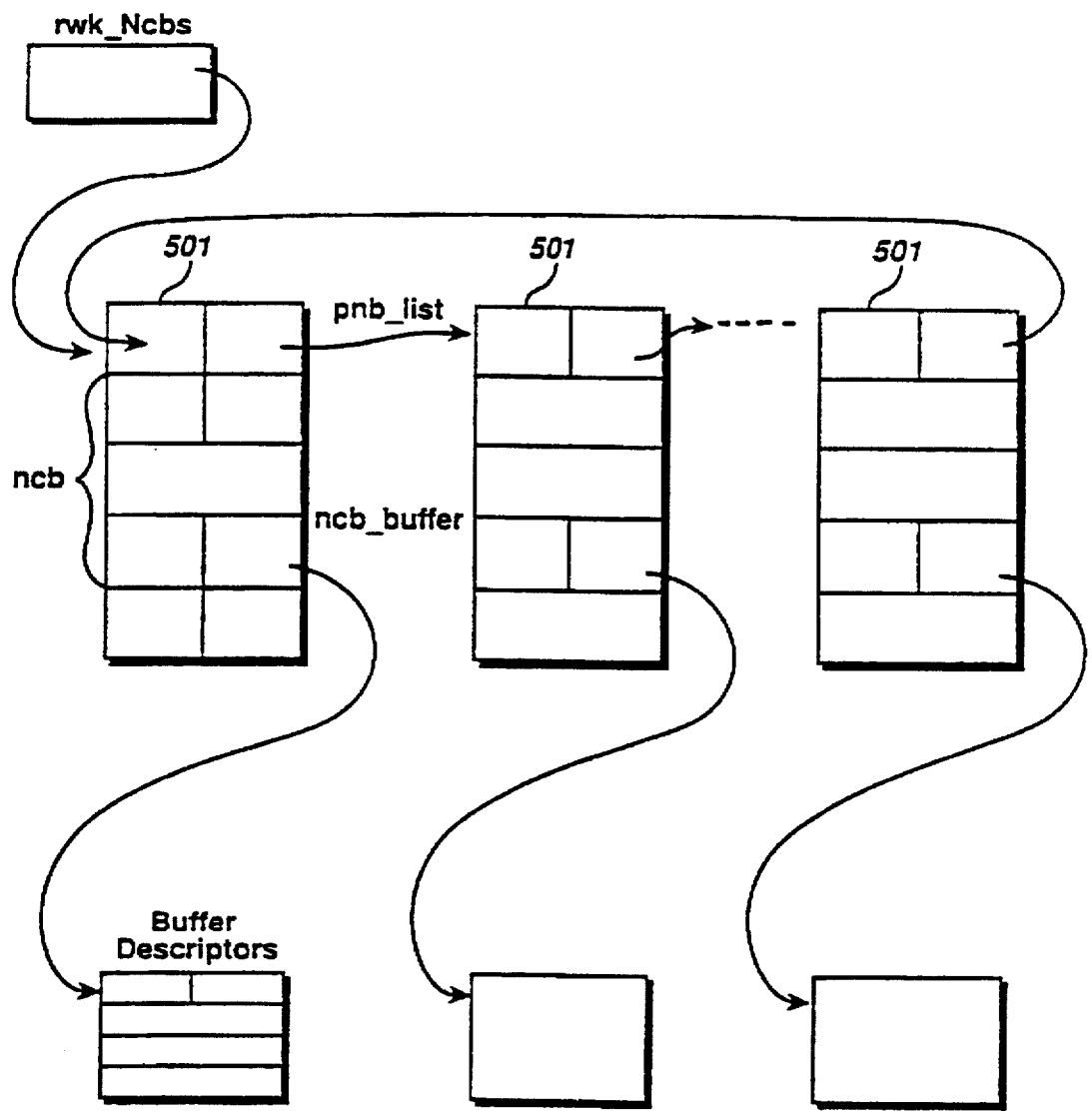
FIG. 5 shows the data structure layout of the PNBs, Buffer Descriptors, and Data Descriptors.

In blocks 602 through 606, the system executes a loop initializing the PNBs. The PNBs 501 are a circular-linked list, as shown in FIG. 5. The PNBs contain information relating to the transport, including the NCBs needed to issue a transport request to the network driver. In a preferred embodiment, there are six PNBs in the linked list. However, the number of PNBs can be varied based upon available memory and other considerations. The variable rwk_cNcbs contains the number of PNBs in the linked list, and the variable rwk_ncbs contain a pointer to the first PNB in the list. In block 602, the system sets count equal to rwk_ cNcbs. The variable count controls the number of times the loop at blocks 604 through 606 is executed. In block 603, the system selects the first PNB, which is pointed to by rwk_ ncbs.

In block 604, the system initializes the selected PNB. The system initializes a couple of the NCB fields: ncb_ command, to indicate a transport request and ncb_cmd_ cplt to indicate the command is not complete. In block 605, the system selects the next PNB, which is pointed to by pnb_list of the currently selected PNB. In block 606, the system decrements count, and if count is not equal to 0, then the system loops to block 604 to initialize the newly selected PNB, else all the PNBs are initialized and the system continues at block 607. When the loop at blocks 604 through 606 completes (i.e., count=0), the currently selected PNB is the first PNB, that is, the PNB pointed to by rwk_ncbs.

Figure 6B:
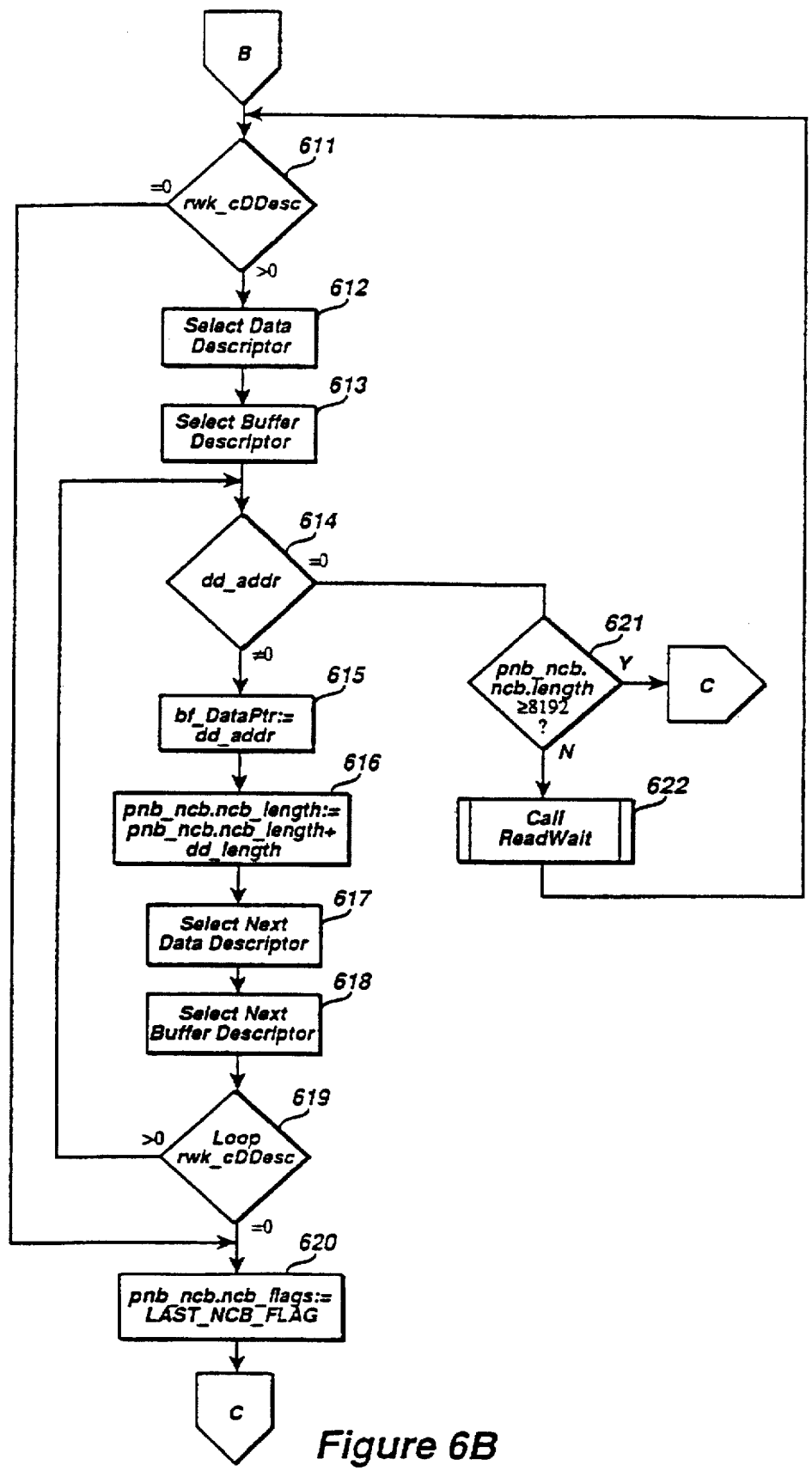
Figure 6C:
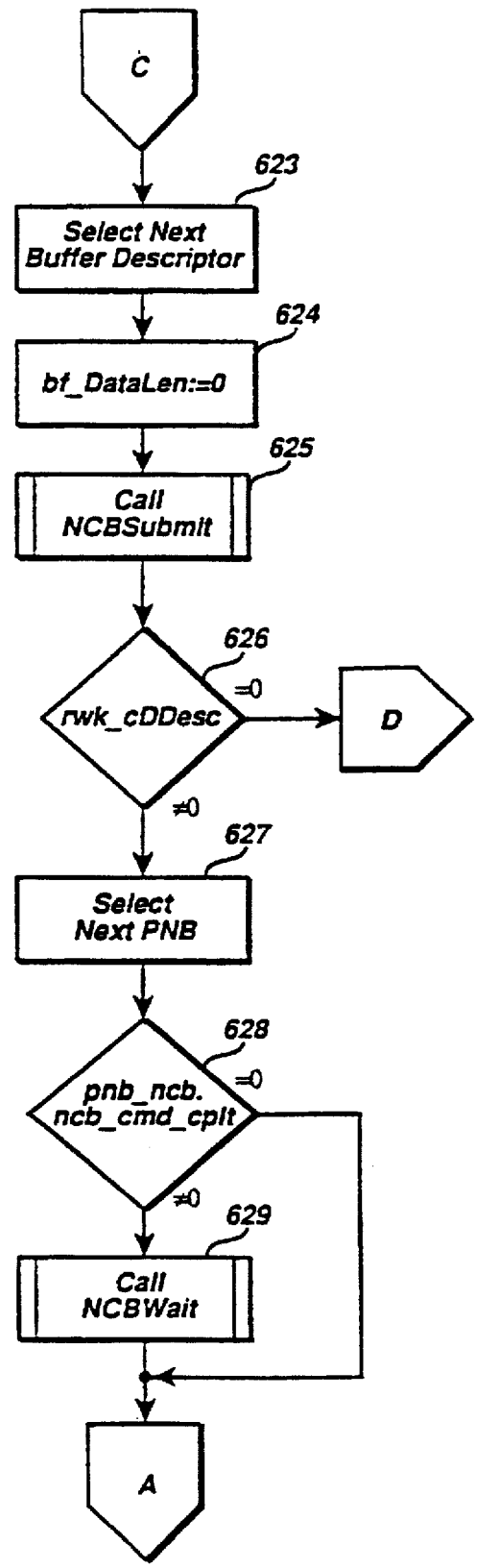
Figure 6D:
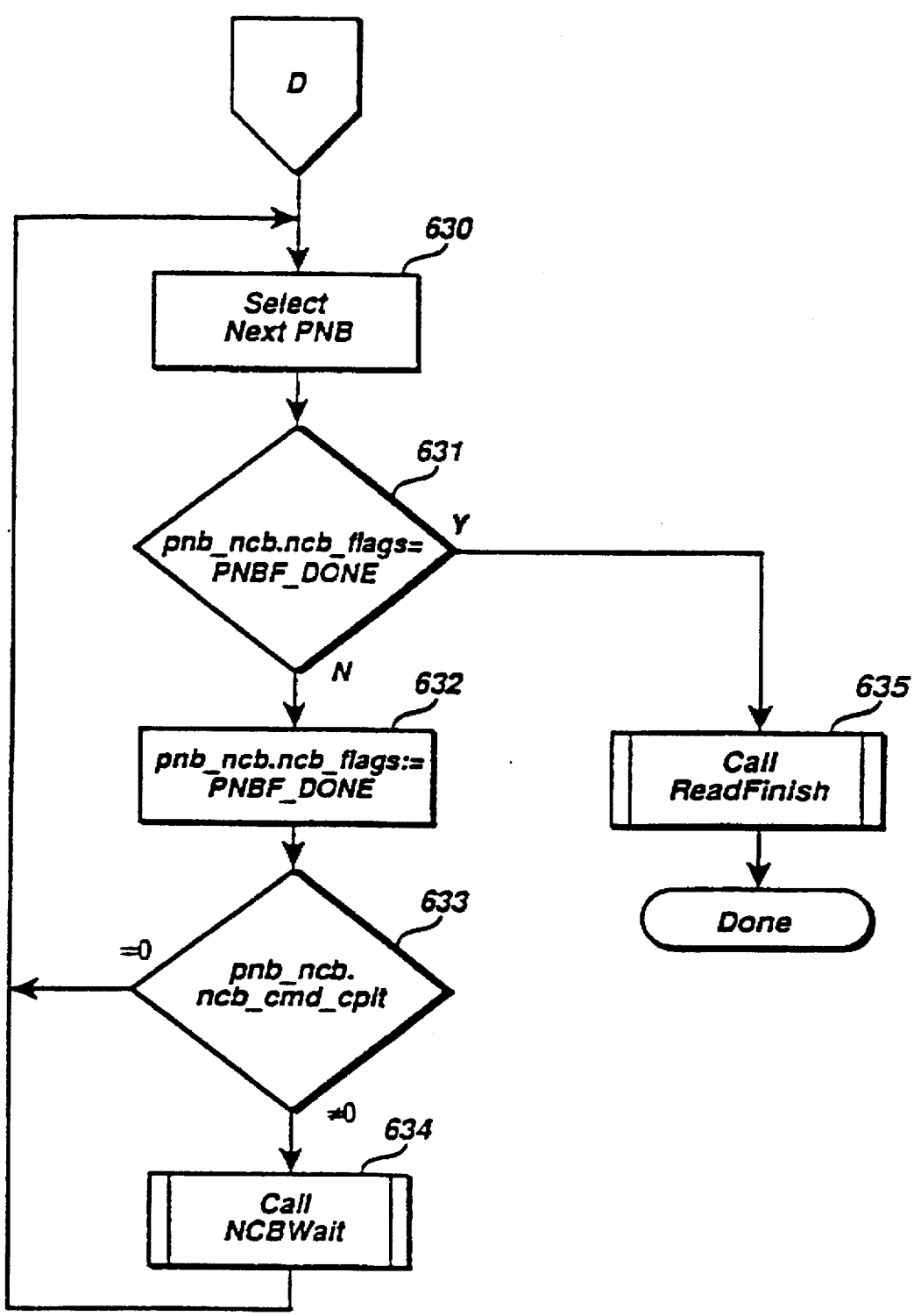

Blocks 607 through 629 in FIGS. 6A, 6B, and 6C compose a loop which initializes an NCB and associated Buffer Descriptor and then submits the NCB to the network driver. In a preferred embodiment, the use of a circular-linked list for the PNBs simplifies the processing. However, other data organization techniques may be used. Referring to FIG. 6A, the first time through the loop, the system executes block 607. On subsequent executions of the loop, the system executes block 608. In block 607, the system sets pnb_ ncb.ncb_flags equal to the constant FIRST_NCB_FLAG. This setting indicates to the network driver that the NCB is the first of a group of NCEs. In block 608, the system sets pnb_ncb.ncb_flags equal to 0, which indicates to the network driver that the NCB is in the middle of a group of NCBs. In block 609, the system sets pnb_ncb.ncb_buffer to point to the Buffer Descriptor pointed to by rwk_pBufDesc. In block 610, the system sets pnb_ncb.ncb_length equal to 0. The variable pnb_ncb.ncb_length holds the total number of bytes a data to be transferred with a PNB. The system then continues at block 611 in FIG. 6B.

In blocks 611 through 619 of FIG. 6B, the system prepares an NCB and associated Buffer Descriptors for sending to the network driver. In a preferred embodiment, the system associates no less than 8,192 bytes of data with an NCB unless the last NCB for the read request is being prepared. In blocks 611 through 619, the system loops processing the Data Descriptors. The system waits until each Data Descriptor has its associated cache buffer filled by the file system. The file system indicates that a cache buffer has been filled by setting dd_addr to 0. When the system selects a cache buffer that has been filled, the system initializes a Buffer Descriptor to point to the cache buffer and increases the length of the data associated with the NCB being prepared. In a preferred embodiment, the Buffer Descriptors are stored as an array-like data structure. However, other data storage techniques such as a heap or a linked list may be used. The Buffer Descriptors associated with an NCB are contiguous elements of the array-like structure. When the system selects a cache buffer that has not yet been filled, the system either sends the prepared NCB to the network driver or waits until the cache buffer is filled. The system sends the NCB to the network driver when the number of associated data bytes is greater than or equal to 8,192.

The variable rwk_cDDesc contains the count of Data Descriptors whose associated cache buffers have not yet been submitted to the network driver. In block 611, if rwk_cDDesc is equal to 0 then all the Data Descriptors have been processed and the system prepares to send the last NCB by continuing at block 620, else the system continues at block 612. In block 612, the system selects the next unprocessed Data Descriptor. In block 613, the system selects the next unused buffer descriptor.

In blocks 614 through 619, the system processes the Data Descriptors until one is encountered whose associated cache buffer has not yet been filled or until all the Data Descriptors have been processed. In block 14, if dd_addr for the selected Data Descriptor equals 0, then the associated cache buffer has not yet been filled and the system continues at block 621, else the system continues at block 615. In block 615, the system sets bf_DataPtr of the selected Buffer Descriptor to point to the filled cache buffer associated with the selected Data Descriptor. In block 616, the system increases pnb_ncb.ncb_length for the selected NCB by the number of bytes of data in the cache buffer, which is stored in dd_length. In block 617, the system selects the next Data Descriptor. In block 618, the system selects the next Buffer Descriptor. In block 619, the system decrements rwk_cDDesc. If rwk_cDDesc is equal to 0, then all the Data Descriptors have been processed and the system continues at block 620 to submit the selected NCB to the network driver, else the system loops to block 614 to process the next Data Descriptor.

In block 621, if pnb_ncb.ncb_length is greater than or equal to 8,192, then the system submits the selected NCB to the network driver by continuing at block 623 of FIG. 6C, else the system continues at block 622. In block 622, the system calls subroutine ReadWait, which returns when the selected cache buffer has been filled and the system continues at block 611.

In block 620, pnb_ncb.ncb_flags is set to LAST_NCB_FLAG to indicate that the selected NCB is the last NCB to be submitted to the network driver for the read request. The system then continues at block 623 of FIG. 6C.

Referring to FIG. 6C in block 623, the system selects the next Buffer Descriptor as a list terminator. In block 624, the system sets bf_DataLen equal to zero to indicate that the selected Buffer Descriptor terminates the list. In block 625, the system calls subroutine NCBSubmit to send the selected NCB to the network driver. In block 627, if rwk_cDDesc equals 0, then all the cache buffers represented by the Data Descriptors have been submitted to the network driver and the system continues at block 630 of FIG. 6D, else more cache buffers need to be submitted to the network driver and the system continues at block 627.

In block 627, the system selects the next PNB, which is pointed to by pnb_list of the currently selected PNB. In block 628, if pnb_ncb.ncb_cmd_cplt of the selected PNB equals 0, then the network driver has transmitted the data that was previously pointed to by the selected NCB and the system loops to block 608 of FIG. 6A to reuse the NCB, else the network driver has not completed transmitting the data and the system waits for the completion by continuing at block 629. In block 629, the system calls subroutine NCBWait to wait for the completion of the NCB request represented by the currently selected PNB. The system then loops to block 608 of FIG. 6A.

In blocks 630 through 635, the system ensures that all the NCB requests are complete and that all the cache buffers are not held. In block 630, the system selects the next PNB, which is pointed to by pnb_list of the currently selected PNB. In block 631, if pnb_ncb.ncb_flags of the selected PNB equals the constant PNBF_DONE, then all the NCB requests have been completed and the system continues at block 635, else the system continues at block 632. In block 632, the system sets pnb_ncb.ncb_flags of the selected PNB equal to PNBF_DONE to indicate that the NCB request represented by the selected PNB has completed. In block 633, if pnb_ncb.ncb_cmd_cplt of the selected PNB equals 0, than the network driver has transmitted the data that was previously pointed to by the selected PNB and the system loops to block 630 to check the next PNB, else the network driver has not completed transmitting the data and the system waits for the completion by continuing at block 634. In block 634, the system calls subroutine NCBWait to wait for the completion of the NCB request represented by the currently selected PNB.

In block 635, the system calls subroutine ReadFinish to remove the hold on the file and the cache buffers. The subroutine ReadRaw is then complete and returns.

ReadInit Subroutine

The subroutine ReadInit initializes the Data Descriptor List for the file and issues an asynchronous read request. The ReadInit subroutine processes the file extent by extent. The subroutine takes the data for each extent and initializes the appropriate Data Descriptor. The input parameters are the file handle Fid, seek position seek_position, and number of bytes to read rwk_cbData. This routine returns a pointer to the first Data Descriptor in rwk_pDDesc, the number of Data Descriptors in rwk_cDDesc, and the number of bytes read in rwk_cbData.

Figure 7A:
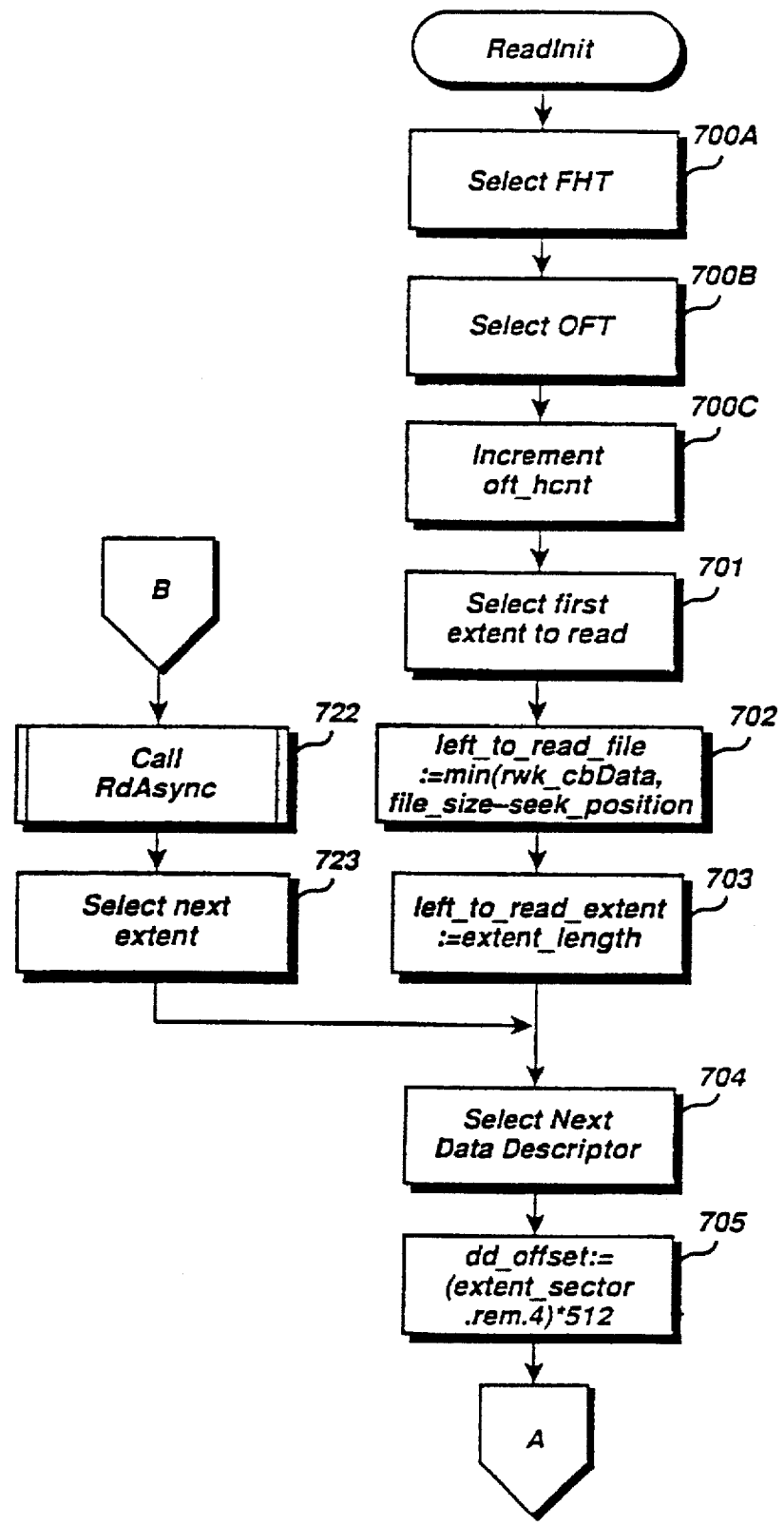
FIGS. 7A, 7B, and 7C are a flow diagram of the subroutine ReadInit.
Figure 7B:
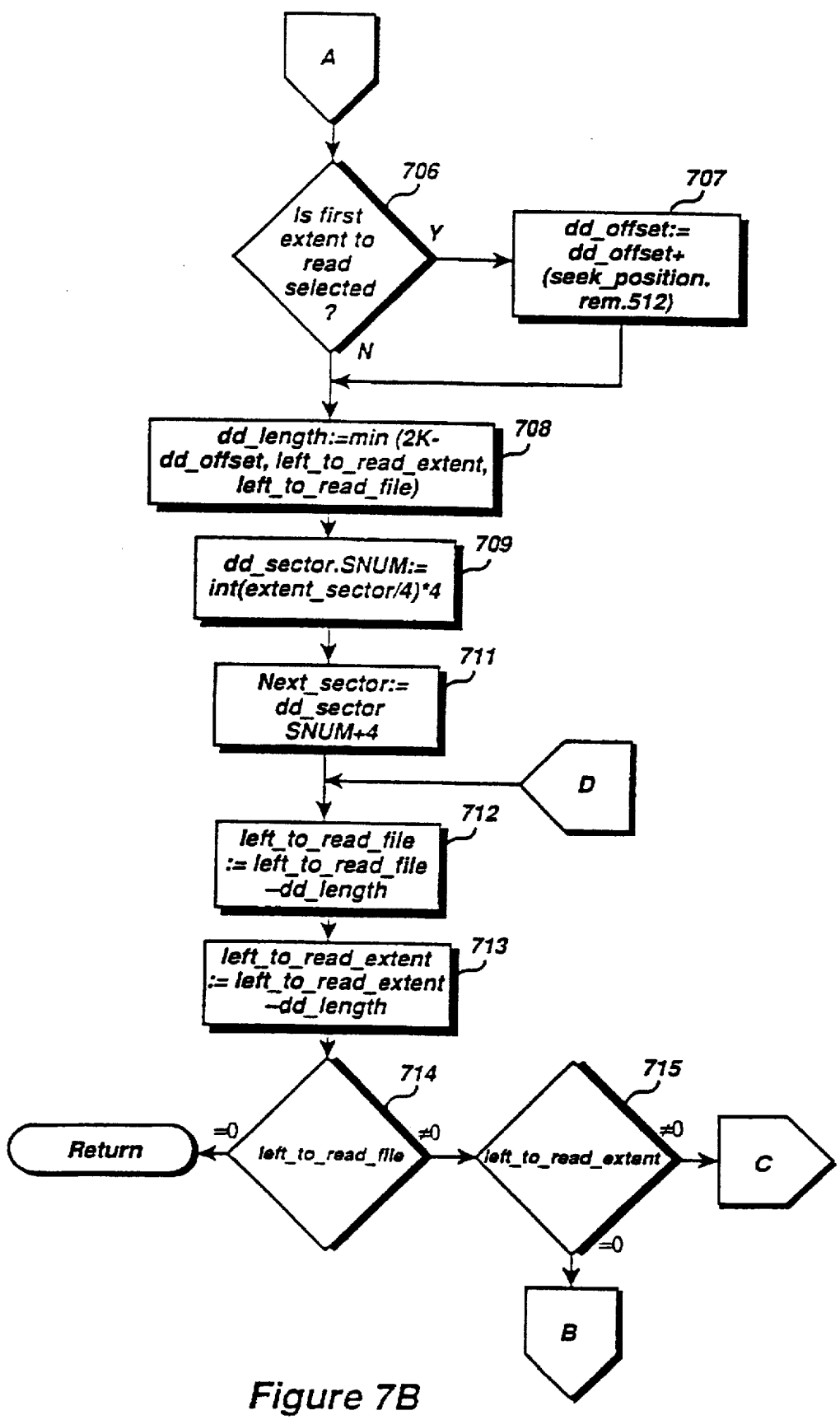
Figure 7C:
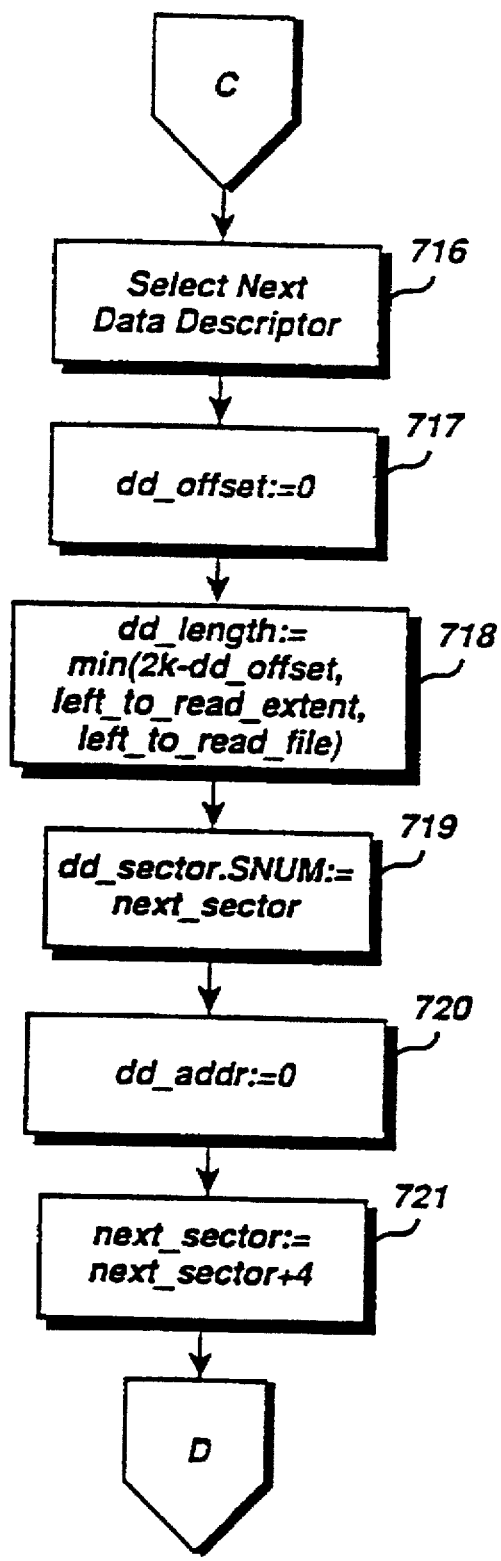

FIGS. 7A, 7B, and 7C are a flow diagram of the ReadInit subroutine. Referring to FIG. 7A, in block 700A, the system selects the File Handle Table entry (FHT) for the file, which is pointed to by Fid. FIG. 16 shows the data structures that hold information relating to each open file. In block 700B, the system selects the Open File Table entry OFT, pointed to by the selected FHT. In block 700C, the system increments oft_hcnt of the selected OFT, which is the hold count for the file. In block 701, the system selects the first extent to be read in the file. This extent is based on the seek position, which is the offset in bytes in the file at which the read is to start. In block 702, the system sets the local variable left_to_read_file equal to the minimum of rwk_cbData and file_size minus seek_position. The variable left_to_read_file contains the number of bytes left to process in the read request. The variable file_size equals the total number of bytes in the file. The file_size minus seek_position term ensures that the requested number of bytes does not extend past the end of file. In block 703, the system sets the local variable left_to_read_extent equal to extent_length. The variable left_to_read_extent contains the number of bytes left to process in the selected extent. The variable extent_length equals the number of bytes in the selected extent.

In block 704, the system selects the next Data Descriptor. In blocks 705 through 709, the system initializes the Data Descriptor fields for the first cache buffer allocated to an extent. In block 705, the system sets dd_offset of the selected Data Descriptor equal to the offset in the cache buffer at which the first sector of the selected extent will be stored, that is, 512 times the remainder of extent_sector divided by 4. The variable extent_sector contains the starting sector address of the selected extent. If the first extent in the read is being accessed, then dd_offset of the selected Data Descriptor is adjusted to reflect that the application may not be requesting the read to start on a sector boundary. Referring to FIG. 7B, in block 706, if the first extent to read is selected, then in block 707 the system adds the remainder of seek_position divided by 512 to dd_offset of the selected Data Descriptor and continues at block 708. In block 708, the system sets dd_length of the selected Data Descriptor equal to the minimum of 2K minus dd_offset of the selected Data Descriptor, left_to_read_extent, and left_to_read_file. This setting accounts for reads that do not end on a 2K boundary. In block 709, the system sets dd_sector.SNUM equal to the sector address of the first sector to be stored in the associated cache buffer for the selected extent. The first sector is next lower four-sector boundary of the extent sector, that is, 4 times the integer portion of extent_sector divided by 4.

In block 711, the system sets the local variable next_sector equal to dd_sector.SNUM plus 4, the next sector in the extent starts on a four-sector boundary. In block 712, the system decrements left_to_read_file by dd_length of the selected Data Descriptor. In block 713, the system decrements left_to_read_extent by dd_length of the selected Data Descriptor.

In block 714, if left_to_read_file equals 0, then all the Data Descriptors for the read request have been initialized and the ReadInit subroutine returns, else the system continues at block 715.

In block 715, if left_to_read_extent equals 0, then all the Data Descriptors for the selected extent have been initialized and the system continues at block 722 in FIG. 7A to process the next extent, else the system continues at block 716 in FIG. 7C.

Referring to FIG. 7C, in block 716, the system selects the next Data Descriptor to be initialized. In blocks 717 through 720, the system initializes the selected Data Descriptor. In block 717, the system sets dd_offset of the selected Data Descriptor to 0. In block 718, the system sets dd_length of the selected Data Descriptor equal to the minimum of 2K minus dd_offset, left_to_read_extent, and left_to_read_file. In block 719, the system sets dd_sector.SNUM of the selected Data Descriptor equal to next_sector. In block 720, the system sets dd_addr of the selected Data Descriptor equal to 0. In block 721, the system sets next_sector equal to next_sector plus 4 and the system loops to block 712 to process the rest of the extent.

Referring to FIG. 7A, in block 722, the system issues an asynchronous read request to initiate a read from the selected extent into the cache memory by calling subroutine RdAsync. In block 723, the routine selects the next extent to be processed and continues with the loop at block 704.

ReadAsync Subroutine

The RdAsync subroutine determines whether the specified sectors are in a cache buffer. If they are, then subroutine RdAsync sets the passed Data Descriptor to point to the cache buffer, else the subroutine issues an asynchronous read request to load a cache buffer with the data from the sectors. The input parameter is a pointer to the selected Data Descriptor which contains the sector number.

Figure 8:
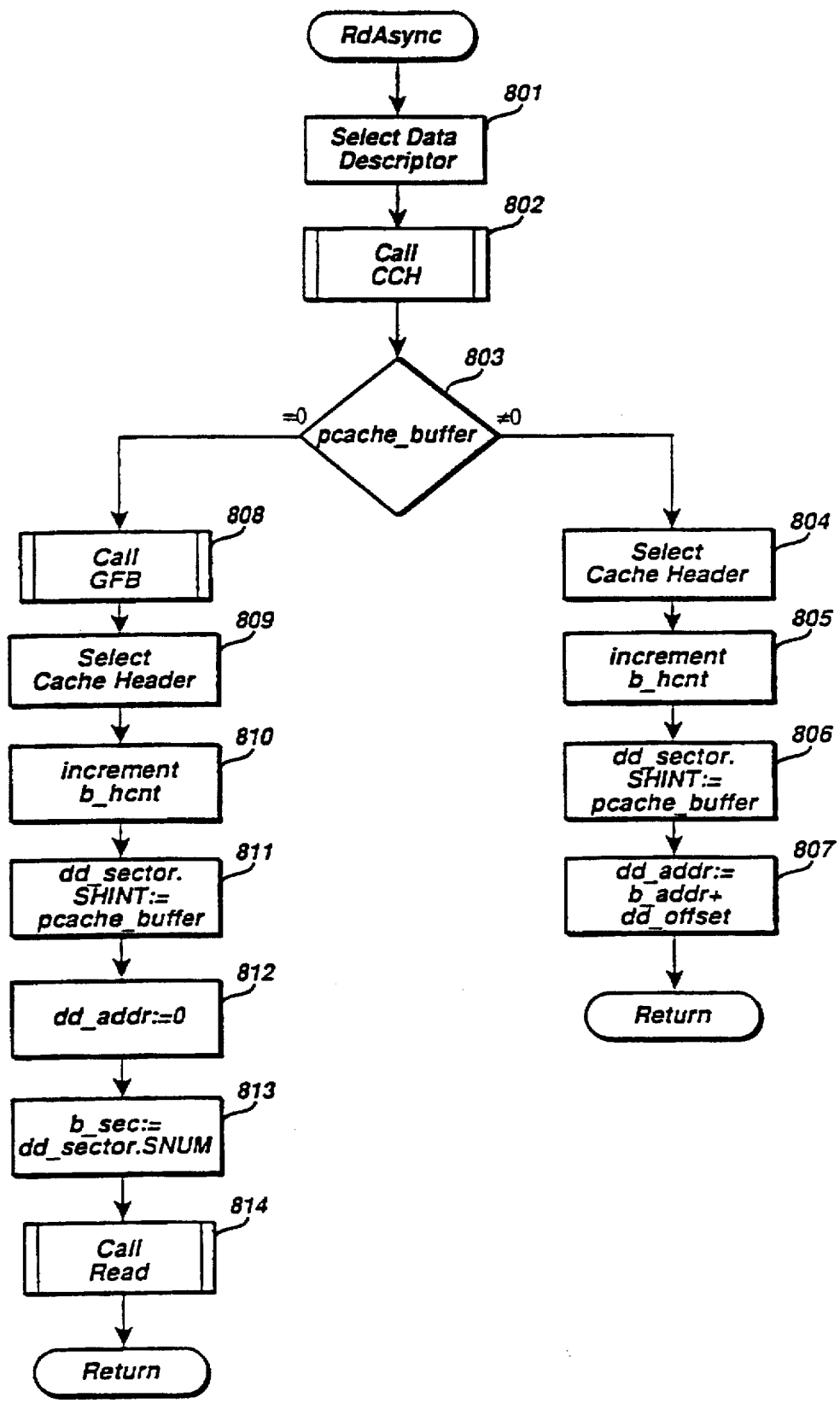
FIG. 8 is a flow diagram of the subroutine RdAsync.
Figure 9:
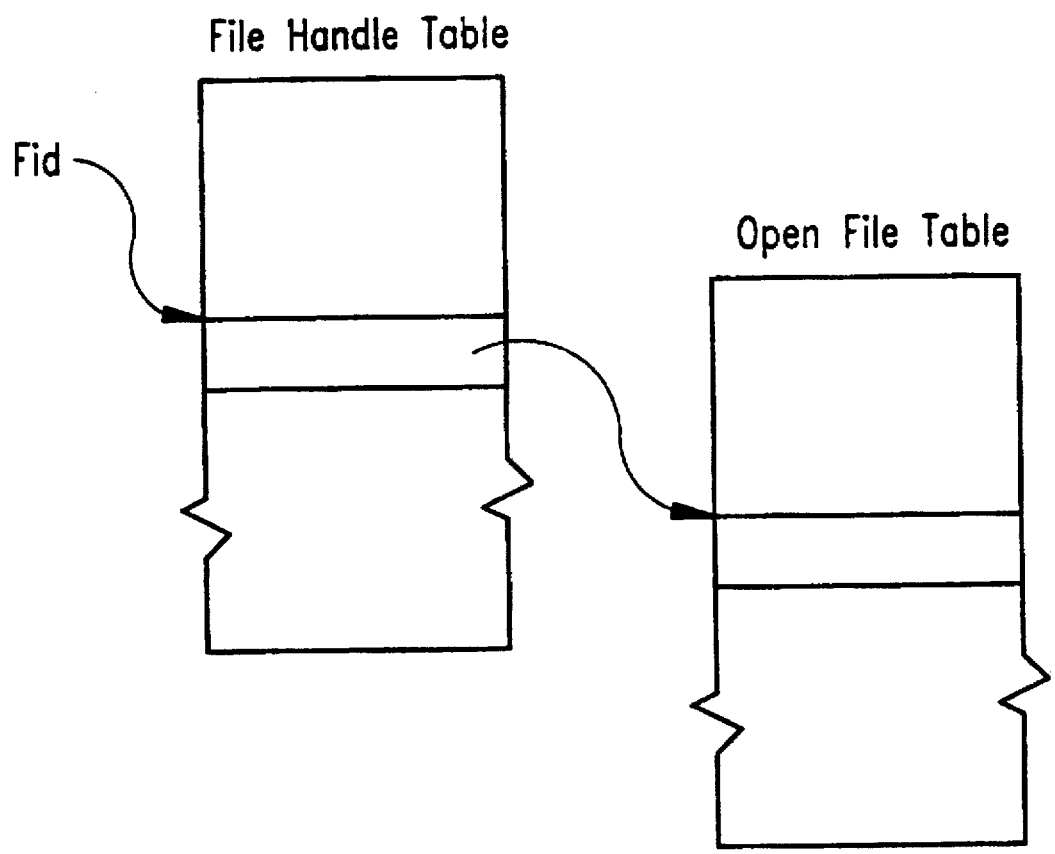
FIG. 9 shows the relationship between the File Handle Table and the Open File Table.

FIG. 8 is a flow diagram of subroutine RdAsync. Referring to FIG. 8, in block 801, the system selects the passed Data Descriptor. In block 802 the system calls subroutine CCH. Subroutine CCH determines whether the sector specified by dd_sector.SNUM of the selected Data Descriptor currently in a cache buffer and returns its address in pcache_buffer. In block 803, if pcache_buffer equals 0, then the sector is not in a cache buffer and the system continues at block 808, else the system continues at block 804.

In block 804, the system selects the cache buffer pointed to by pcache_buffer. In block 805, the system places a hold on the cache buffer by incrementing b_hcnt. In block 806, the system sets dd_sector.SHINT equal to pcache_buffer. In block 807, the system sets dd_addr equal to b_addr plus dd_offset. The variable dd_addr contains the address in the cache buffer of the data. Subroutine RdAsync then returns.

In block 808, the system calls subroutine GFB, which returns the address of an available cache buffer in pcache_buffer. In block 809, the system selects the cache header for the cache buffer pointed to by pcache_buffer. In block 810, the system places a hold on the cache buffer by incrementing b_hcnt. In block 811, the system sets dd_sector.SHINT equal to pcache_buffer. In block 812, the system sets dd_addr to 0 to indicate that the cache buffer has not yet been loaded with the data from the file. In block 813, the system sets b_sec equal to dd_sector.SNUM. In block 814, the system issues an asynchronous read request and then returns. The asynchronous read request instructs the file system to read the specified sectors into the held cache buffer. The file system sets dd_addr to the address in the cache buffer of where the file data begins.

ReadFinish Subroutine

Figure 10:
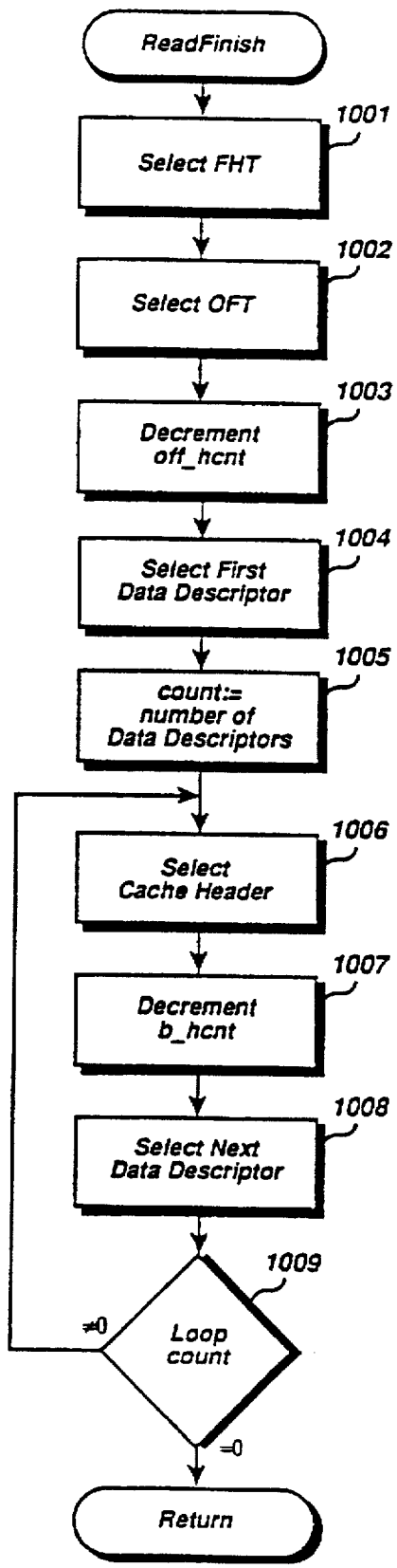
FIG. 10 is a flow diagram of the subroutine ReadFinish.

The subroutine ReadFinish decrements the hold count of the file and removes the hold from the cache buffers. The input parameters are the file handle, a pointer to the first Data Descriptor, and the count of Data Descriptors. FIG. 10 shows a flow diagram of the ReadFinish subroutine. In block 1001, the system selects the FHT, that is, the entry in the File Handle Table pointed to by the file handle. In block 1002, the system selects the OFT, that is, Open File Table entry, pointed to by fht_oft. In block 1003, the system decrements oft_hcnt, the hold count of the file.

In block 1004, the system selects the first Data Descriptor in the group. In blocks 1005 through 1009, the system executes a loop once for each Data Descriptor in the group. In block 1005, the system sets count equal to the number of Data Descriptors; the variable count controls the number of times the loop is executed. In block 1006, the system selects the cache header pointed to by dd_sector.SHINT of the selected Data Descriptor. In block 1007, the system decrements b_hcnt, which is the hold count for the selected cache header. In block 1008, the system selects the system Data Descriptor. In block 1009, the system decrements count and if count equals 0, then the hold count for each of the cache buffers has been decremented and subroutine ReadFinish returns, else the system loops to block 1006 to process the recently selected Data Descriptor.

WRITE REQUEST

In a preferred embodiment of the present invention, the file server receives a write request from the network driver. If the write is a "raw mode" write then the file server calls the WriteRaw subroutine. A raw mode write request indicates that the sending computer will send the file data onto the network without accompanying header information and without packaging the data. Basically, the file server computer receives only the file data. The sending computer when it sends the write request may include with that transmission a portion of the data to be written to the file. This data is called the immediate data. The data that is transmitted later in the raw mode is called the raw data. When the file server calls the WriteRaw subroutine it passes the file handle, the seek position, and the byte count along with a pointer to the immediate data and the number of bytes in the immediate data.

In a preferred embodiment of the present invention, the file system initializes a list of Data Descriptors and holds the associated cache buffers. The network driver when it receives the raw mode data stores the data directly into the cache buffers. The file system then writes the cache buffer to the file and removes the hold.

WriteRaw Subroutine

The WriteRaw subroutine processes a request to write data to a file by allocating cache buffers, issuing a request to receive the data, and then writing the cache buffers to the file on disk. This routine is invoked when a WriteRaw request is received by the network server. The input parameters are the file handle, the seek position, the byte count to write, a pointer to the immediate data, and the byte count of the immediate data.

Figure 11A:
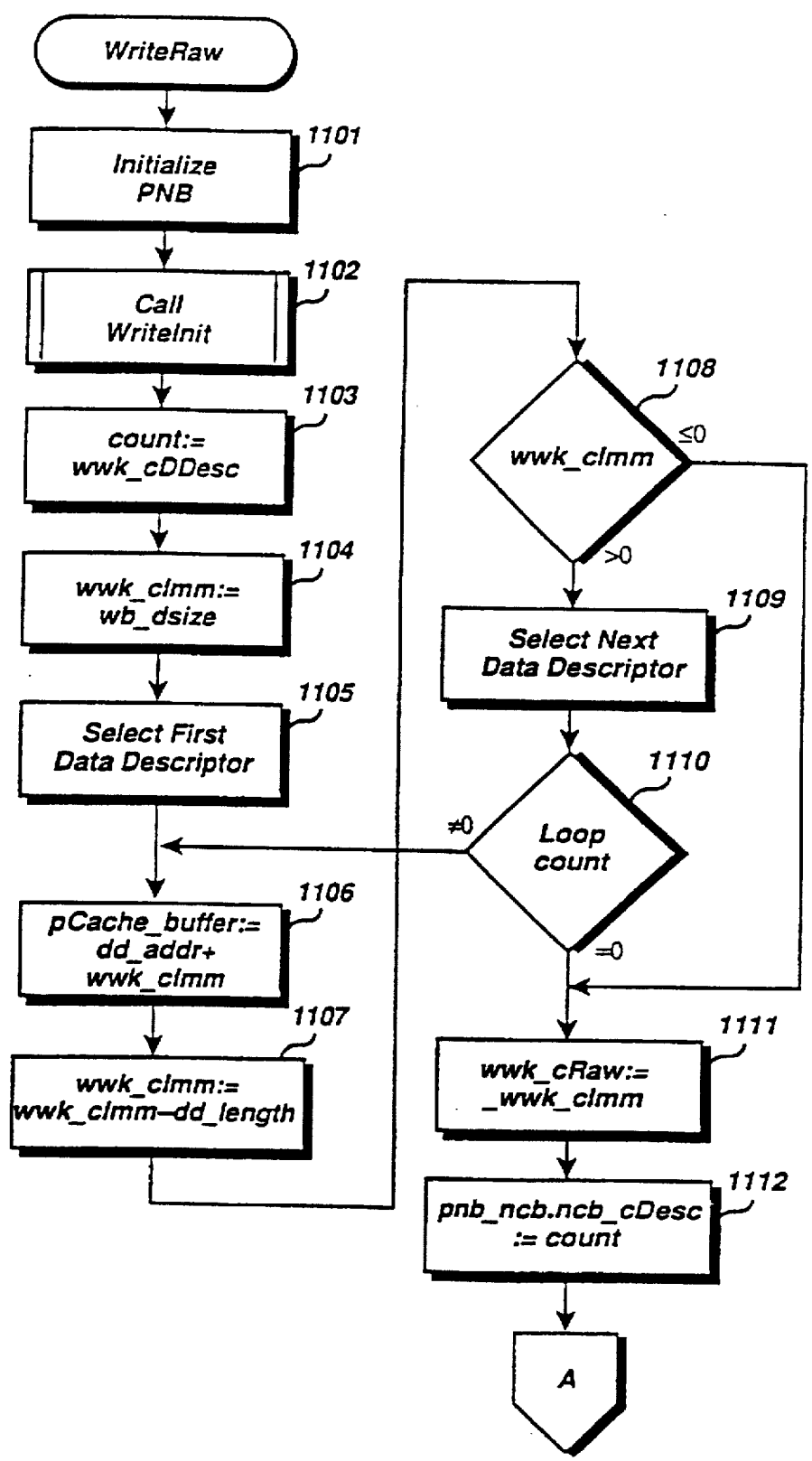
FIGS. 11A and 11B are a flow diagram of the subroutine WriteRaw.
Figure 11B:
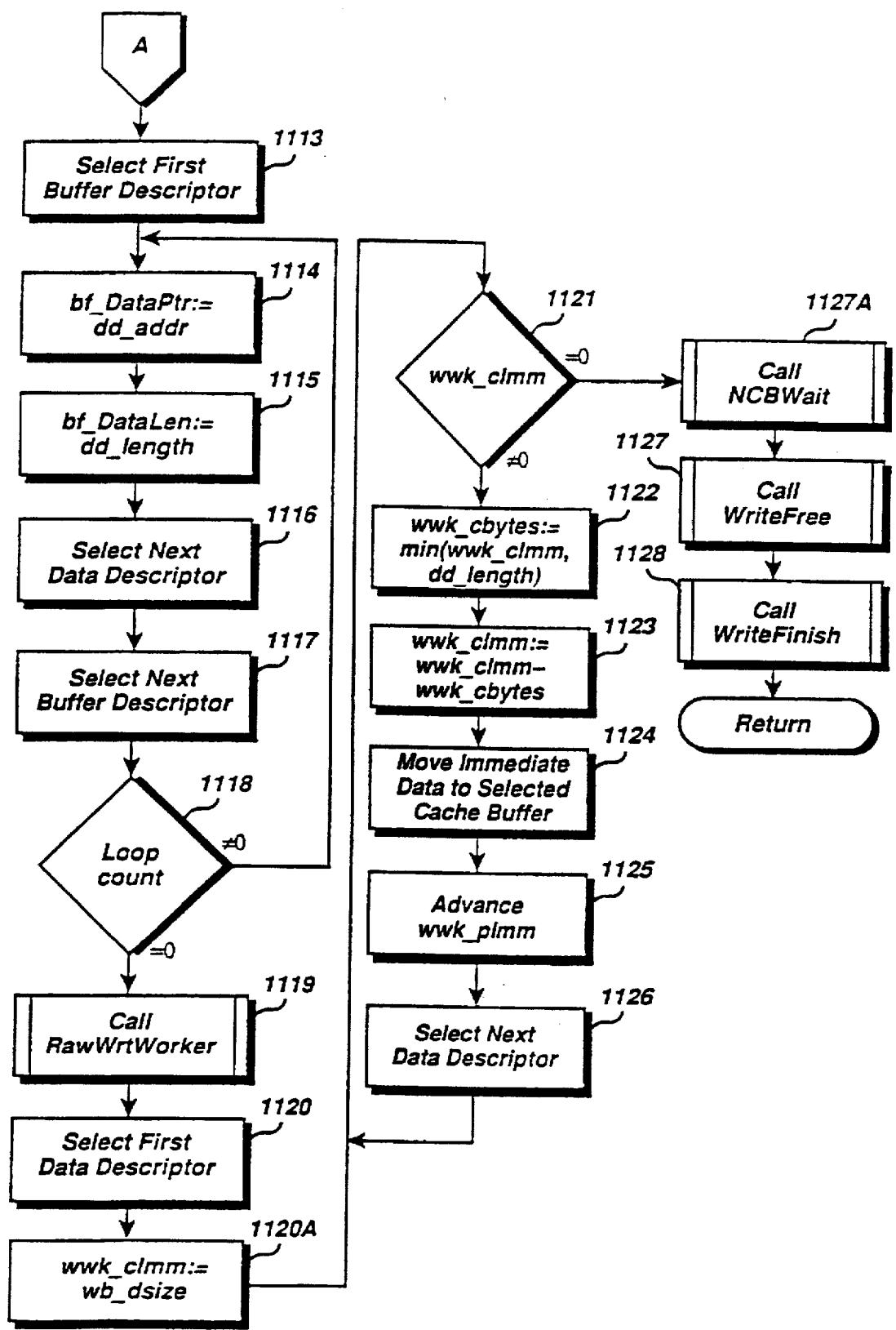

FIGS. 11A and 11B show a flow diagram of the WriteRaw subroutine. In block 1101, the system initializes the PNB data structure. The system initializes a couple of the NCB fields. The system sets ncb_command to indicate a write raw request. The system also sets ncb_buffer to point to the first Buffer Descriptor at wwk_bufDesc. In block 1102, the system calls subroutine WriteInit. The subroutine WriteInit locks the file for the duration of the write, extends the file size if the write request is beyond the current end of file, and initializes the Data Descriptors for the write request. This subroutine returns wwk_cDDesc, the count of Data Descriptors, and wwk_pDDesc, which is a pointer to the Data Descriptors.

Since immediate data has been included in the write request, the system must transfer the immediate data to the cache buffers. In a preferred embodiment, the system does not transfer the data until after the system issues a receive request to the network driver for the rest of the data, that is, the non-immediate or raw data. The system sets aside a group of Data Descriptors for the immediate data. In blocks 1103 through 1110, the system loops through the Data Descriptors. When this loop is completed, the Data Descriptor for the cache buffer at which the first raw data will be stored is selected. In block 1103, the system sets count equal to wwk_cDDesc, which is the number of Data Descriptors. In block 1104, the system sets wwk_cImm equal to wb_dsize, which is the number of bytes of immediate data. The variable wwk_cImm controls the termination of the loop at block 1108. When there is no raw data, then the variable count controls the termination of the loop at block 1110. In block 1105, the system selects the first Data Descriptor, which is pointed to by wwk_pDDesc.

In block 1106, the system sets pCache_buffer equal to dd_addr of the selected Data Descriptor plus wwk_cImm. At the termination of the loop, the variable pCache_buffer will contain the offset into the selected cache buffer at which the first byte of raw data is to be stored. In block 1107, the system decrements wwk_cImm by dd_length of the selected Data Descriptor to account for the immediate data that will be moved to the selected cache buffer. In block 1108, if wwk_cImm is less than or equal to 0, then the system has selected the Data Descriptor for the first byte of raw data and continues at block 1111, else the system continues at block 1109. In block 1109, the system selects the next Data Descriptor. In block 1110, the system decrements count and if count is not equal to 0, then not all the Data Descriptors for the immediate data have been set aside and the system loops to block 1106, else the system continues at block 1111.

In block 1111, the system sets wwk_cRaw equal to the negative of wwk_cImm, which is the number of bytes of raw data that will fit into the last cache buffer of immediate data. In block 1112, the system sets pnb_ncb.ncb_cDesc equal to count, which is the number of Data Descriptors for the raw data.

Referring to FIG. 11B, in blocks 1113 through 1118, the system initializes the Buffer Descriptors for the call to the network driver to receive the raw data. Before block 1113 is executed, the system has selected the first Data Descriptor for the raw data. In block 1113, the system selects the first Buffer Descriptor, which is at wwk_bufDesc. In block 1114, the system sets bf_DataPtr of the selected Buffer Descriptor equal to dd_addr of the selected Buffer Descriptor, which points to the cache buffer for the selected Data Descriptor. In block 1115, the system sets bf_DataLen of the selected Buffer Descriptor equal to dd_length of the selected Data Descriptor. At block 1116, the system selects the next Data Descriptor. In block 1117, the system selects the next Buffer Descriptor. In block 1118, the system decrements count and if count is not equal to 0, then the system has not yet initialized all the Buffer Descriptors and loops to block 1114, else the system continues at block 1119.

Before block 1119 is executed, the system has initialized the PNB and the Buffer Descriptors. The system is ready to issue the receive raw data request to the network driver. In block 1119, the system calls subroutine RawWrtWorker to issue this request.

In blocks 1120 through 1126, the system moves the immediate data to the cache buffers. In block 1120, the system selects the first Data Descriptor. In block 1120A, the system sets wwk_cImm equal to wb_dsize; the variable wwk_cImm controls the termination of the loop in block 1121. In block 1121, if wwk_cImm equals 0, then the system has moved all the immediate data to the cache and continues at block 1127, else the system continues at block 1122. In block 1122, the system sets wwk_cbytes equal to the minimum of wwk_cImm and dd_length of the selected Data Descriptor; the variable wwk_cbytes equals the number of bytes to be written to the selected cache buffer. In block 1123, the system decrements wwk_cImm by wwk_cbytes to reflect the number of immediate bytes left to move. In block 1124, the system moves a group of immediate bytes to the selected buffer. In block 1125, the system advances a wwk_pImm to point to the next group of immediate bytes to move. In block 1126, the system selects the next Data Descriptor and loops to block 1121.

In block 1127A, the system calls subroutine NCBWait to wait until the network I/O is complete. In block 1127, the system calls subroutine WriteFree to write each of the cache buffers pointed to by the Data Descriptors to the file and removes the hold from the cache buffers. In block 1128, the system calls subroutine WriteFinish to update the directory for the file and remove the lock from the file and then the subroutine WriteRaw returns.

WriteInit Subroutine

The subroutine WriteInit locks the file, extends the file size if the data to be written extends beyond the current end of file, and calls subroutine SetupWD to initialize the Data Descriptor. The input parameters are the file handle, seek position, and number of bytes to write to the file.

Figure 12:
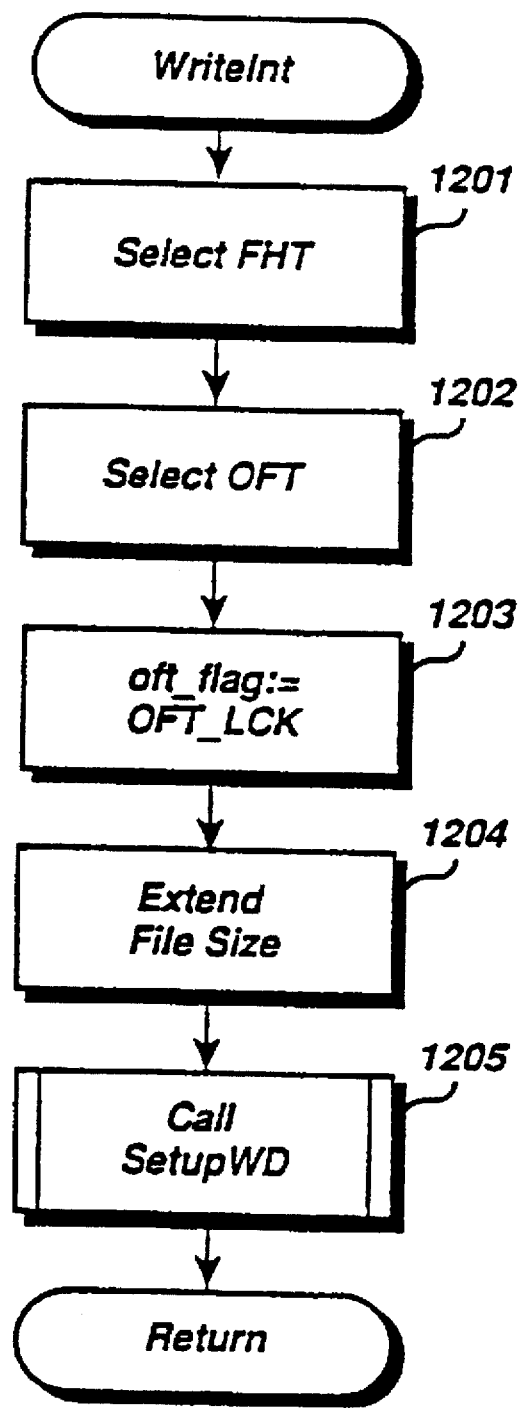
FIG. 12 is a flow diagram of the subroutine WriteInit.

FIG. 12 shows a flow diagram of the subroutine WriteInit. In block 1201, the system selects the File Handle Table entry for the file. In block 1202, the system selects the Open File Table entry for the file, which is pointed to by the FHT. In block 1203, the system locks the file. In block 1204, the system extends the file size as appropriate. In block 1205, the system calls the subroutine SetupWD, which initializes the Data Descriptors and then returns from subroutine WriteInit.

SetupWD Subroutine

The subroutine SetupWD initializes the Data Descriptors with information for the receiving of data from the network. The subroutine is passed the file handle Fid, a pointer to the Data Descriptors wwk_pDDesc, the seek position in the file seek_position, and the number of bytes to write, wwk_cbytes.

Figure 13A:
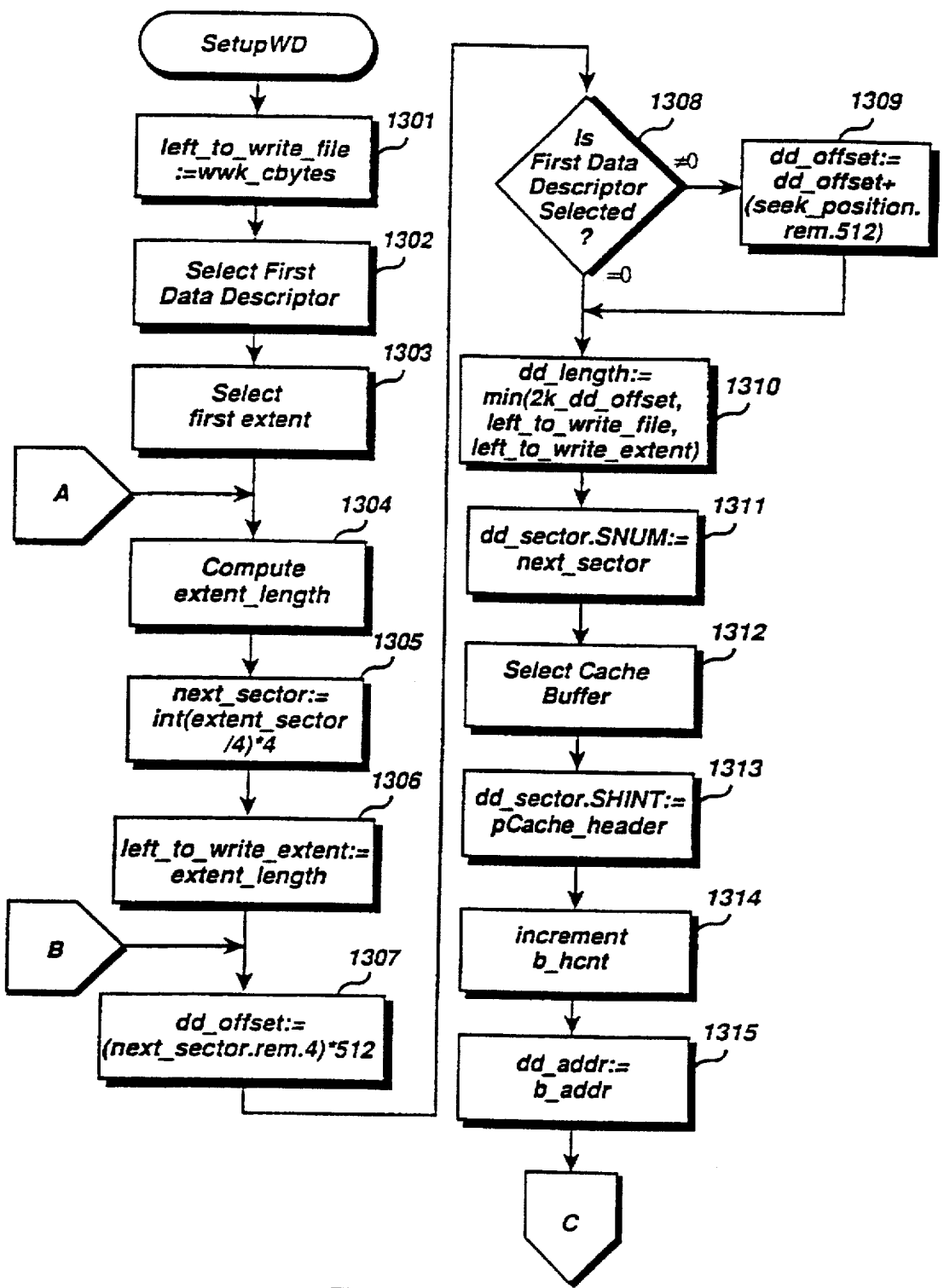
FIGS. 13A and 13B are a flow diagram of the subroutine SetUpWD.
Figure 13B:
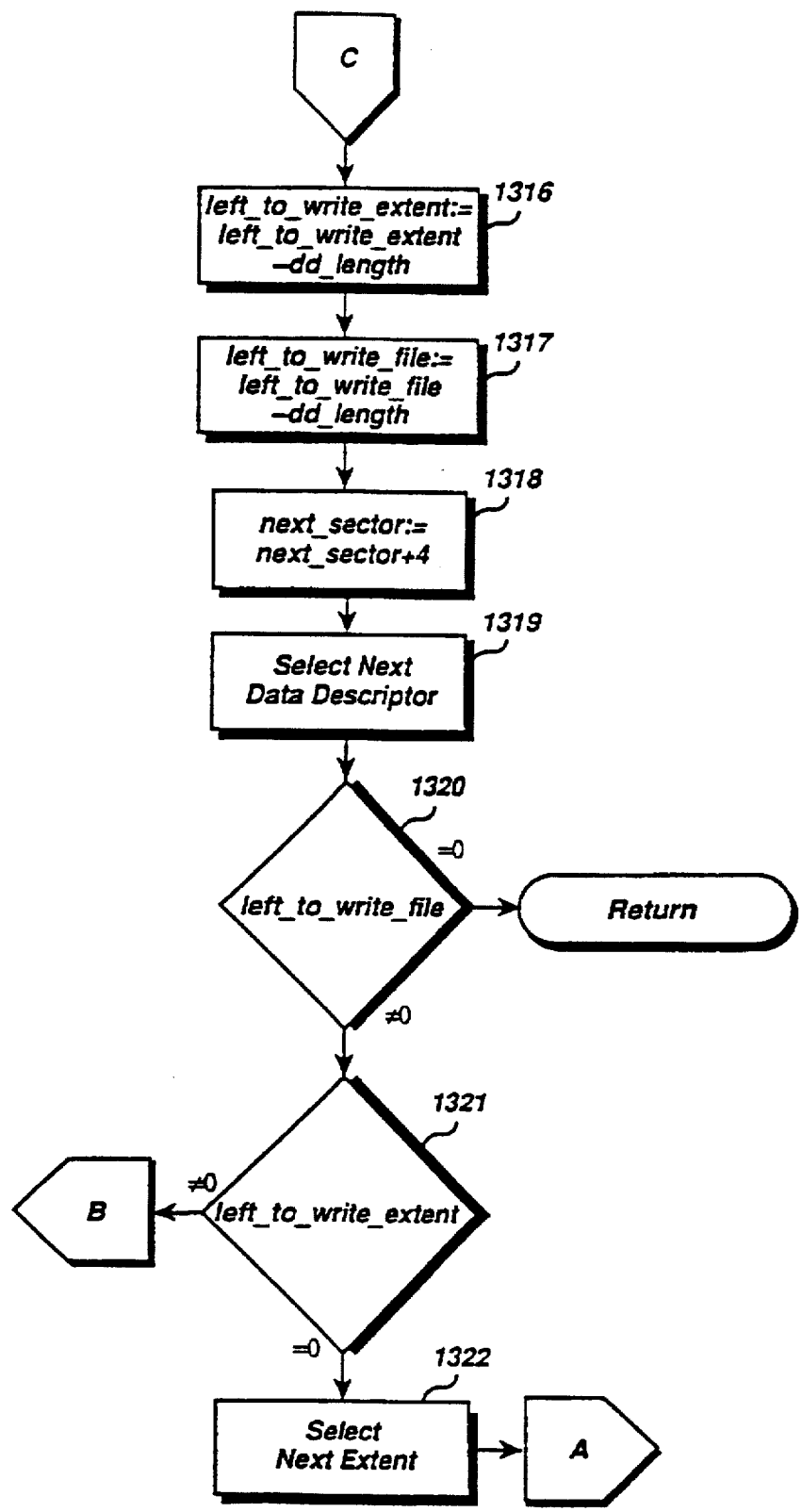

FIGS. 13A and 13B are flow diagrams of the SetupWD subroutine. In block 1301, the system sets the local variable left_to_write_file equal to wwk_cbytes; the variable left_to_write_file contains the number of bytes in the write request for which the system has not initialized a Data Descriptor.

The system loops through blocks 1304 through 1322, selecting each extent in the file and initializing the Data Descriptors for the cache buffer in which the data for the selected extent is to be written. In block 1302, the system selects the first Data Descriptor. In block 1303, the system selects the first extent in the file and stores the sector address for the extent in local variable extent_sector.

In block 1304, the system computes the number of bytes in the extent and stores the result in local variable extent_length. In block 1305, the system sets the local variable next_sector equal to 4 times the integer portion of extent_sector divided by 4; the variable next_sector contains the sector number of the first sector associated with the Data Descriptor. In block 1306, the system sets the local variable left_to_write_extent equal to extent_length; the variable left_to_write_extent contains the number of bytes that are to be written to the selected extent for which the system has not initialized a Data Descriptor.

In block 1307, the system sets dd_offset of the selected Data Descriptor equal to 512 (sector size) times the remainder of next_sector divided by 4. The variable dd_offset contains the offset in the cache buffer at which the write data will be stored. In block 1308, if the first Data Descriptor is selected, then the offset into the cache buffer may not be on a sector boundary and the system continues at block 1309, else the system continues at block 1310. In block 1309, the system increments dd_offset by the remainder of seek_position divided by 512 to account for seek positions that do not start on a sector boundary.

In block 1310, the system sets dd_length of the selected Data Descriptor equal to the minimum of 2K minus dd_offset, left_to_write_file, and left_to_write_extent. In block 1311, the system sets dd_sector.SNUM equal to next_sector. In block 1312, the system selects a cache buffer in which to store the data for the selected extent. In a preferred embodiment, this selection is accomplished by a cache manager subroutine, which returns the address of the cache header for the selected buffer in pCache_header. In block 1313, the system sets dd_sector.SHINT equal to pCache_header. In block 1314, the system increments the hold count, b_hcnt for the selected cache buffer. In block 1315, the system sets dd_addr equal to b_addr, which is the address of the cache buffer.

Referring to FIG. 13B, in blocks 1316 and 1318, the system updates certain variables for the next execution of the loop. In block 1316, the system decrements left_to_write_extent by dd_length of the selected Data Descriptor. In block 1317, the system decrements left_to_write_file by dd_length. In block 1318, the system increment next_sector by 4 to give the sector number of the next sector in the extent. In block 1319, the system selects the next Data Descriptor. In block 1320, if left_to_write_file equals 0, then the system has initialized all the Data Descriptors and the subroutine SetupWD returns, else the system continues at block 1321. In block 1321, if left_to_write_extent equals 0, then the system has initialized the Data Descriptors for the recently selected extent and the system selects the next extent in block 1322 and loops to block 1304 in FIG. 13A to initialize the Data Descriptors for the selected extent, else the system loops to block 1307 in FIG. 13A to initialize the next Data Descriptor for the selected extent.

WriteFree Subroutine

The subroutine WriteFree writes each of the cache buffers that contains the received data to the disk and decrements the hold count of the cache buffers. The input parameters are wwk_pDDesc, the pointer to the Data Descriptors, and wwk_cDDesc, the number of Data Descriptors.

FIG. 14 shows a flow diagram of the subroutine WriteFree. In block 1401, the system selects the first Data Descriptor. In block 1402, the system sets count equal to wwk_cDDesc; the variable count controls the number of times the loop comprising blocks 1403 through 1408 is executed. In block 1403, the system selects the cache header pointed to by dd_sector.SHINT of the selected Data Descriptor. In block 1404, the system sets the number of bytes from the selected cache buffer that are to be written to disk. In block 1405, the system decrements the hold count, b_hcnt, for the cache buffer. In block 1406, the system calls subroutine WriteBuffer to write the data in the selected cache buffer to disk. In block 1407, the system selects the next Data Descriptor. In block 1408, the system decrements count and if count equals 0, then the subroutine WriteFree returns, else the system loops to block 1403 to write the next cache buffer.

WriteFinish Subroutine

The subroutine WriteFinish updates the directory for the file and removes the lock on the file. The input parameter is file handle.

FIG. 15 is a flow diagram of the WriteFinish subroutine. In block 1501, the system selects the File Handle Table entry for the file. In block 1502, the system selects the Open File Table entry for the file, which is pointed to by the FHT. In block 1503, the system calls subroutine UpdateDirectory, which updates the directory information for the file. In block 1504, the system removes the lock from the file and the subroutine returns.

Although the present invention has been described in terms of a preferred embodiment, it is not intended that the invention be limited to these embodiments. Modifications within the spirit of the invention will be apparent to those skilled in the art. For example, the different data structures may be used and a different internal organization of the subroutines may be used with acceptable results. The scope of the present invention is defined by the claims that follow.

We claim:

1. A method in a computer system for concurrent access of a plurality of portions of external data loaded by an operating system for an application program, the computer having computer memory, the method comprising:

A. the following steps performed by an operating system:
      receiving a request of an application program for access to a plurality of portions of external data;
      initializing a list of pointers with a predefined value, the pointers for pointing to buffers within the computer memory and being accessible by the application program; and
      for each of the plurality of portions of the external data,
         retrieving the portion of the external data;
         storing the retrieved portion in a buffer; and
         updating a pointer in the list of pointers to point to the buffer containing the retrieved portion; and B. the following steps performed by an application program:
      for each pointer in the list of pointers,
         when the pointer has been updated to point to a buffer containing the retrieved portion, accessing the portion of the external data stored in the buffer pointed to by the updated pointer before the operating system has completed storing all of the portions of the external data in the buffers.

2. The method of claim 1 wherein the application program is a file server.

3. The method of claim 1 wherein the operating system includes a file system that performs the steps of retrieving and storing the portions of the external data.

4. The method of claim 3 wherein the computer memory is a cache memory of the file system.

5. A method of accessing a file stored on a computer storage device, the storage device operatively connected to a computer, the computer having an operating system and a computer memory, the operating system having a file system, the method comprising the steps of:

requesting the file system to load the file into computer memory for access by an application program; and
   for each of a plurality of portions of the file, performing the following steps by the file system:
      retrieving the portion of the file from the storage device;
      storing the retrieved portion of the file in the computer memory; and
      updating a pointer to point to the stored portion of the file; and
   performing the following steps by the application program:
      waiting until the file system updates the pointer; and
      concurrently reading the stored portion of the file pointed to by the updated pointer from the computer memory while the file system is performing the steps of retrieving and storing another portion of the file.

6. The method of claim 5, including the additional step of transporting the read portion of the file onto a computer network, wherein the transporting is performed concurrently with the steps of retrieving and storing another portion of the file.

7. A method for transporting data from a storage device onto a computer network, the storage device and the computer network operatively connected to a file server computer having a file system, a file server, and a transport system, the file system having data descriptors and cache buffers, each data descriptor having a pointer to a cache buffer, the method comprising the steps of:

receiving a request to transport data onto the computer network;
   performing the following steps by the file system:
      selecting a set of data descriptors to be updated as the data is loaded from the storage device into the cache buffers; and
      for each of a plurality of portions of the data,
         selecting the next data descriptor from the selected set of data descriptors, starting with the first data descriptor;
         selecting a cache buffer to receive the portion of the data to be loaded from the storage device;
         loading the portion of the data from the storage device into the selected cache buffer; and
         updating the selected data descriptor to point to the selected cache buffer;
   for each portion of the data loaded, performing the following steps by the file server:
      selecting a next data descriptor from the selected set of data descriptors, starting with the first data descriptor;
      waiting for the file system to update the selected data descriptor to point to a cache buffer; and
      signalling the transport system to transport onto the computer network the portion of the data in the cache buffer pointed to by the selected data descriptor; and
   performing the following steps by the transport system:
      for each signal to transport a portion of the data in a cache buffer,
         reading the portion of the data stored in the cache buffer; and
         writing the data onto the computer network to effect the transport of the data.

8. A method for receiving data from a computer network and storing the data on a storage device, the computer network and the storage device operatively connected to a file server computer having a file system, a file server, and a transport system, the file system having data descriptors and cache buffers, each data descriptor having a pointer for pointing to a cache buffer, the method comprising the steps of:

receiving a request to store data received from a computer network onto the storage device;
   selecting a set of data descriptors to be updated as the data is loaded from the computer network into the cache buffers;
   setting the pointer in each selected data descriptor to point to a cache buffer;
   performing the following steps by the transport system:
      for each of a plurality of portions of the data,
         selecting a next data descriptor from the selected set of data descriptors, starting with the first data descriptor;
         receiving the portion of the data from the computer network; and
         storing the received portion of the data in a cache buffer pointed to by the selected data descriptor; and
      signalling the file server that all the data has been received;

when signalled that all the data has been received, signalling the file system by the file server that the cache buffers contain the received data; and when signalled that the cache buffer contains the received data, for each portion of the data stored in the cache buffers, performing the following steps by the file system:
  selecting a next data descriptor from the selected set of data descriptors, starting with the first data descriptor; and
  writing the portion of the data stored in the cache buffer pointed to by the selected data descriptor to the storage device.

9. The method of claim 8 wherein the step of receiving a request includes the receiving of immediate data.

10. The method of claim 9, including the additional step of storing the immediate data on the storage device.

11. A method in a computer system for accessing a plurality of portions of external data loaded by an operating system for an application program, the computer having computer memory, the method comprising the steps of:
  performing the following steps by the operating system:
    receiving a request of an application program for access to the external data;
    retrieving a portion of the external data;
    storing the retrieved portion in a buffer;
    setting a pointer to the buffer containing the retrieved portion; and
    for each remaining portion of the external data,
      retrieving a new portion of the external data;
      storing the retrieved new portion in a buffer other than the buffer pointed to by the pointer;
      waiting until the application program accesses the pointer; and
      updating the pointer to point to the buffer containing the retrieved new portion; and
  performing the following steps by the application program:
    waiting until the operating system sets the pointer to point to the buffer containing the retrieved portion;
    when the pointer has been set, accessing the retrieved portion of the external data stored in the buffer pointed to by the set pointer, while the operating system is retrieving a new portion of the external data;
    for another portion of the external data, waiting until the operating system updates the pointer to point to the buffer containing the retrieved new portion; and
    when the pointer has been updated, accessing the portion of the external data stored in the buffer pointed to by the updated pointer, while the operating system is retrieving a new portion of the external data.

* * * * *